US012752229B2

(12) United States Patent
Lawrence et al.

(10) Patent No.: US 12,752,229 B2

(45) Date of Patent: Oct. 6, 2026

(54) CRANKCASE OIL SEPARATION DEVICE FOR INTERNAL COMBUSTION ENGINE

(71) Applicant: Caterpillar Inc., Peoria, IL (US)

(72) Inventors: Rodney Allen Lawrence, Frankfort, IN (US); Joshua Amiel Lehe, West Lafayette, IN (US); Brandyn A. Stack, Lafayette, IN (US); Yegor Litvinov, Shakopee, MN (US)

(73) Assignee: Caterpillar Inc., Peoria, IL (US)

( * ) Notice: Subject to any disclaimer, the term of this patent is extended or adjusted under 35 U.S.C. 154(b) by 354 days.

(21) Appl. No.: 18/519,582

(22) Filed: Nov. 27, 2023

(65) Prior Publication Data

US 2025/0170511 A1 May 29, 2025

(51) Int. Cl.

*B01D 46/00* (2022.01)
*B01D 46/24* (2006.01)
*F01M 13/04* (2006.01)

(52) U.S. Cl.

CPC ....... *B01D 46/003* (2013.01); *B01D 46/2414* (2013.01); *F01M 13/04* (2013.01); *B01D 2265/026* (2013.01); *F01M 2013/0438* (2013.01)

(58) Field of Classification Search

CPC .............. B01D 46/003; B01D 46/0031; B01D 46/2411; B01D 46/2414; B01D 2265/021; B01D 2265/026; F01M 13/04; F01M 2013/0438

See application file for complete search history.

(56) References Cited

U.S. PATENT DOCUMENTS

| | | | |
|---|---|---|---|
| 2,642,052 | A | 6/1953 | Wagner et al. |
| 4,320,005 | A | 3/1982 | Degraffenreid |
| 4,768,493 | A | 9/1988 | Ohtaka et al. |
| 5,171,338 | A | 12/1992 | Baert |
| 5,277,154 | A | 1/1994 | Mcdowell |
| 5,450,835 | A | 9/1995 | Wagner |
| 5,456,239 | A | 10/1995 | Henderson et al. |
| 5,800,584 | A | 9/1998 | Hinderer et al. |
| 5,937,837 | A | 8/1999 | Shaffer et al. |
| 6,126,823 | A | 10/2000 | Soderlund et al. |
| 6,234,154 | B1 | 5/2001 | Spix |

(Continued)

FOREIGN PATENT DOCUMENTS

| | | |
|---|---|---|
| CN | 1070428 | 9/2001 |
| CN | 203436916 | 2/2014 |

(Continued)

OTHER PUBLICATIONS

"U.S. Appl. No. 18/092,525, Non Final Office Action mailed Sep. 28, 2024", 8 pgs.

(Continued)

*Primary Examiner* — Robert Clemente

(57) ABSTRACT

Apparatuses including coalescing filter are discussed and shown. The coalescing filter can optionally include: a filter media; a central core defining a central cavity, the central core positioned within the filter media; a first end cap; a coupling assembly attached to and extending outward from the first end cap, wherein the coupling assembly is configured to couple with a housing to position the coalescing filter within the housing; and a second end cap opposing the first end cap.

20 Claims, 14 Drawing Sheets

(56) References Cited

U.S. PATENT DOCUMENTS

| | | | | |
|---|---|---|---|---|
| 6,561,171 | B2 | 5/2003 | Burgess | |
| 6,691,687 | B1 | 2/2004 | Liang et al. | |
| 6,702,941 | B1 | 3/2004 | Haq et al. | |
| 6,907,869 | B2 | 6/2005 | Burgess et al. | |
| 7,011,690 | B2 | 3/2006 | Altvater et al. | |
| 7,182,864 | B2 | 2/2007 | Brown et al. | |
| 7,311,208 | B2 | 12/2007 | Brown et al. | |
| 7,635,409 | B2 | 12/2009 | Mahoney et al. | |
| 8,210,135 | B2 | 7/2012 | Slaughter et al. | |
| 8,435,405 | B2 | 5/2013 | Hussain | |
| 8,657,901 | B2 | 2/2014 | Chapman | |
| 8,968,446 | B1 | 3/2015 | Mainiero | |
| 9,089,795 | B2 | 7/2015 | Salvador et al. | |
| 9,169,808 | B2 | 10/2015 | Kitagawa | |
| 9,222,698 | B2 | 12/2015 | Mcclanahan et al. | |
| 9,447,714 | B2 | 9/2016 | Khan et al. | |
| 9,581,061 | B2 | 2/2017 | Kurita et al. | |
| 9,650,927 | B2 | 5/2017 | Subedi et al. | |
| 9,677,507 | B2 | 6/2017 | Kurosawa et al. | |
| 9,702,282 | B2 | 7/2017 | Peck et al. | |
| 9,731,236 | B2 | 8/2017 | Girondi | |
| 9,926,888 | B2 | 3/2018 | Okawa et al. | |
| 10,001,040 | B2 | 6/2018 | Copley et al. | |
| 10,184,444 | B2 | 1/2019 | Plenk | |
| 10,213,715 | B2 | 2/2019 | South et al. | |
| 10,543,442 | B2 | 1/2020 | Janakiraman et al. | |
| 10,550,742 | B2 | 2/2020 | Zuerker et al. | |
| 10,639,566 | B2 | 5/2020 | Vogt | |
| 10,704,434 | B2 | 7/2020 | Akita et al. | |
| 10,876,445 | B2 | 12/2020 | Kress et al. | |
| 10,876,631 | B2 | 12/2020 | Zuerker et al. | |
| 11,311,829 | B2 | 4/2022 | Nelson et al. | |
| 11,331,606 | B2 | 5/2022 | Roy et al. | |
| 11,707,703 | B2 | 7/2023 | Immel et al. | |
| 11,839,842 | B2 | 12/2023 | Piva et al. | |
| 11,867,099 | B1 | 1/2024 | Lawrence et al. | |
| 11,946,397 | B1 | 4/2024 | Lawrence et al. | |
| 12,023,619 | B2 | 7/2024 | Parikh et al. | |
| 12,134,065 | B2 * | 11/2024 | Ehrenberg | B01D 50/20 |
| 12,359,593 | B2 | 7/2025 | Lawrence et al. | |
| 12,497,912 | B2 | 12/2025 | Lawrence et al. | |
| 2002/0139731 | A1 | 10/2002 | Michels et al. | |
| 2003/0102257 | A1 | 6/2003 | Reid | |
| 2004/0089600 | A1 | 5/2004 | Haq et al. | |
| 2005/0193694 | A1 | 9/2005 | Gieseke et al. | |
| 2006/0090651 | A1 | 5/2006 | Liu et al. | |
| 2008/0035103 | A1 | 2/2008 | Barris et al. | |
| 2009/0094951 | A1 * | 4/2009 | Baseotto | B01D 46/009 55/498 |
| 2009/0152189 | A1 | 6/2009 | Beaulieu | |
| 2009/0199794 | A1 | 8/2009 | Slaughter et al. | |
| 2010/0051388 | A1 | 3/2010 | Clark et al. | |
| 2010/0058723 | A1 * | 3/2010 | Feisthauer | B01D 46/2411 55/508 |
| 2011/0180052 | A1 | 7/2011 | Schwandt et al. | |
| 2011/0272340 | A1 | 11/2011 | Sasur et al. | |
| 2014/0109885 | A1 | 4/2014 | Kalayci et al. | |
| 2014/0144112 | A1 * | 5/2014 | Campbell | B01D 46/2411 55/482 |
| 2014/0182569 | A1 | 7/2014 | Hwang et al. | |
| 2014/0215982 | A1 | 8/2014 | Wood et al. | |
| 2015/0113931 | A1 * | 4/2015 | Bartel | B01D 46/2411 55/498 |
| 2016/0101380 | A1 * | 4/2016 | Pereira Madeira | B01D 46/009 210/232 |
| 2016/0333754 | A1 | 11/2016 | Peck et al. | |
| 2017/0014745 | A1 | 1/2017 | Zuerker et al. | |
| 2017/0144091 | A1 | 5/2017 | Wolhowe | |
| 2018/0104630 | A1 | 4/2018 | Miyanaga et al. | |
| 2018/0171946 | A1 | 6/2018 | Furukawa et al. | |
| 2018/0304179 | A1 | 10/2018 | Auxter et al. | |
| 2019/0218947 | A1 | 7/2019 | Akita et al. | |
| 2019/0308123 | A1 * | 10/2019 | Neef | B01D 46/0045 |
| 2020/0141293 | A1 | 5/2020 | Kanniaraj et al. | |
| 2020/0346152 | A1 * | 11/2020 | Rieger | F02M 35/02483 |
| 2020/0346154 | A1 * | 11/2020 | Rieger | B01D 46/2403 |
| 2020/0346160 | A1 * | 11/2020 | Rieger | B01D 46/2414 |
| 2020/0398287 | A1 | 12/2020 | Mincher et al. | |
| 2021/0138380 | A1 | 5/2021 | Neef et al. | |
| 2022/0161179 | A1 | 5/2022 | Healey et al. | |
| 2022/0314148 | A1 | 10/2022 | Calcaterra et al. | |
| 2022/0372899 | A1 | 11/2022 | Himuro et al. | |
| 2023/0264130 | A1 * | 8/2023 | Canik | B01D 46/2414 210/348 |
| 2023/0313750 | A1 | 10/2023 | Li et al. | |
| 2024/0218816 | A1 | 7/2024 | Lawrence et al. | |
| 2024/0218817 | A1 | 7/2024 | Lawrence et al. | |
| 2026/0092543 | A1 | 4/2026 | Lawrence et al. | |

FOREIGN PATENT DOCUMENTS

| | | | | |
|---|---|---|---|---|
| CN | 107701263 | | 2/2018 | |
| CN | 207420558 | | 5/2018 | |
| CN | 108993050 | | 12/2018 | |
| CN | 109424388 | | 10/2020 | |
| CN | 111927594 | | 11/2020 | |
| CN | 112824656 | | 5/2021 | |
| CN | 112901309 | | 6/2021 | |
| CN | 222208049 | | 12/2024 | |
| DE | 102004031619 | | 2/2006 | |
| DE | 10310452 | | 8/2008 | |
| DE | 112011101646 | | 7/2013 | |
| DE | 102016006095 | | 1/2017 | |
| DE | 102018120329 | A1 * | 2/2020 | B01D 46/2414 |
| DE | 102015215933 | | 3/2020 | |
| EP | 0774289 | | 5/1997 | |
| EP | 1762293 | | 3/2007 | |
| EP | 2478949 | | 7/2012 | |
| EP | 1965045 | | 12/2012 | |
| EP | 2934716 | | 10/2015 | |
| EP | 2175961 | B1 | 5/2016 | |
| EP | 2726171 | | 5/2017 | |
| EP | 3401000 | A1 | 11/2018 | |
| EP | 4245398 | A1 | 9/2023 | |
| JP | 2007247448 | | 9/2007 | |
| JP | 4448418 | | 1/2010 | |
| JP | 5085523 | | 9/2012 | |
| JP | 6126885 | | 4/2017 | |
| JP | 2017066963 | | 4/2017 | |
| KR | 20150131229 | A * | 11/2015 | B01D 46/2411 |
| KR | 101714717 | | 3/2017 | |
| KR | 20210009662 | | 1/2021 | |
| KR | 20220104883 | | 7/2022 | |
| WO | 2015108853 | | 7/2015 | |
| WO | 2020064205 | | 4/2020 | |
| WO | 2022187897 | | 9/2022 | |

OTHER PUBLICATIONS

"U.S. Appl. No. 18/092,525, Response filed Dec. 16, 2024 to Non Final Office Action mailed Sep. 28, 2024", 10 pgs.

"German Application No. 10 2023 138 812.5, Office Action and Search Report mailed Feb. 25, 2025", 5 pgs.

"German Application No. 10 2023 138 813.3, Office Action and Search Report mailed Feb. 25, 2025", 5 pgs.

"International Application Serial No. PCT US2025 049099, Written Opinion and International Search Report mailed Jan. 26, 2006", 22 pgs.

"International Application Serial No. PCT US2025 046128, Written Opinion and International Search Report mailed Dec. 11, 2025", 14 pgs.

"International Application Serial No. PCT US2025 050871, Written Opinion and International Search Report mailed Feb. 2, 2026", 13 pgs.

"U.S. Appl. No. 18/092,525, Notice of Allowance mailed Mar. 12, 2025", 10 pgs.

"U.S. Appl. No. 18/092,502, Non Final Office Action mailed Mar. 11, 2025", 9 pgs.

"U.S. Appl. No. 18/092,502, Response filed Jun. 11, 2025 to Non Final Office Action mailed Mar. 11, 2025", 8 pgs.

(56) References Cited

OTHER PUBLICATIONS

"U.S. Appl. No. 18/092,502, Notice of Allowance mailed Aug. 22, 2025", 9 pgs.
"U.S. Appl. No. 18/092,502, Corrected Notice of Allowability mailed Sep. 2, 2025", 6 pgs.
"U.S. Appl. No. 18/092,502, Corrected Notice of Allowability mailed Oct. 2, 2025", 7 pgs.
"U.S. Appl. No. 18/092,502, Amendment Under 1.312 mailed Oct. 1, 2025", 7 pgs.
"U.S. Appl. No. 18/092,547, Notice of Allowance mailed Aug. 23, 2023", 11 pgs.
"U.S. Appl. No. 18/092,547, Corrected Notice of Allowability mailed Oct. 3, 2023", 6 pgs.
"U.S. Appl. No. 18/141,579, Notice of Allowance mailed Dec. 1, 2023", 9 pgs.
"U.S. Appl. No. 18/904,617, Notice of Allowance mailed Feb. 3, 2026", 10 pgs.
"U.S. Appl. No. 18/904,617, Restriction Requirement mailed Oct. 9, 2025", 7 pgs.
"U.S. Appl. No. 18/904,617, Response filed Dec. 9, 2025 to Restriction Requirement mailed Oct. 9, 2025", 2 pgs.

* cited by examiner

CRANKCASE OIL SEPARATION DEVICE FOR INTERNAL COMBUSTION ENGINE

TECHNICAL FIELD

The present disclosure relates to crankcase ventilation systems for internal combustion engines such as those for vehicles or stationary power generation. More particularly, the present disclosure relates to oil separating devices for crankcase ventilation systems.

BACKGROUND

Machinery, for example, agricultural, industrial, construction or other heavy machinery can be propelled by an internal combustion engine(s). Internal combustion engines can be used for other purposes such as for power generation. Internal combustion engines combust a mixture of air and fuel in cylinders and thereby produce drive torque and power. A portion of the combustion gases (termed "blow-by" gas) may escape the combustion chamber past the piston and enter undesirable areas of the engine such as the crankcase. Blow-by gas can contain un-combusted fuel, oil and explosive gases. In rare cases, un-combusted fuel and/or explosive gases can build within the engine such as within the crankcase. The un-combusted fuel and/or explosive gases can result in an explosion if not properly mitigated such as by a relief valve. Crankcase ventilation systems are known in combustion engines to vent, capture or dilute blow-by gases of the crankcase. Such ventilation systems can include oil separation devices as part of such systems. For example, United States Patent Application Publication No. 2008/0035103A1, U.S. Pat. No. 10,213,715B2 and Japanese Patent No. 6,126,885B2 disclose examples of an oil separation device that is part of crankcase ventilation system. However, this patent application and patents do not recognize various features and components of the present application.

SUMMARY

In an example according to this disclosure, a coalescing filter optionally including: a filter media; a central core defining a central cavity, the central core positioned within the filter media; a first end cap; a coupling assembly attached to and extending outward from the first end cap, wherein the coupling assembly is configured to couple with a housing to position the coalescing filter within the housing; and a second end cap opposing the first end cap.

In another example according to this disclosure, a coalescing filter optionally including: a filter media; a central core defining a central cavity, the central core positioned within the filter media; a first end cap; and a second end cap opposing the first end cap, wherein the second end cap has an aperture that forms an inlet port to the central cavity, wherein the aperture has a non-circular shape and is configured to receive a correspondingly shaped projecting feature of a housing that receives the coalescing filter.

In yet another example according to this disclosure, a device for filtering oil mist from blow-by gas, optionally including: a housing forming an inner cavity, an outlet manifold and an inlet manifold, wherein the housing includes a removable and attachable cover for partially enclosing the outlet manifold; and a coalescing filter insertable and removable from the inner cavity, the coalescing filter including: a filter media; a central core defining a central cavity, the central core positioned within the filter media; a first end cap; a coupling assembly positioned within the outlet manifold, attached to and extending outward from the first end cap, wherein the coupling assembly receives a projection of the cover and is configured to position the coalescing filter within the housing; and a second end cap opposing the first end cap.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples according to this disclosure are directed to an oil separation device(s) for internal combustion engines, and to systems and methods for filtering oil to separate oil and other forms of particulate matter from blow-by gas. Examples of the present disclosure are now described with reference to the accompanying drawings. The following description is merely exemplary in nature and is not intended to limit the present disclosure, application, or use.

Examples described set forth specific components, devices, and methods, to provide an understanding of embodiments of the present disclosure. It will be apparent to those skilled in the art that specific details need not be employed and that examples may be embodied in many different forms. Thus, the examples provided should not be construed to limit the scope of the claims.

Figure 1:
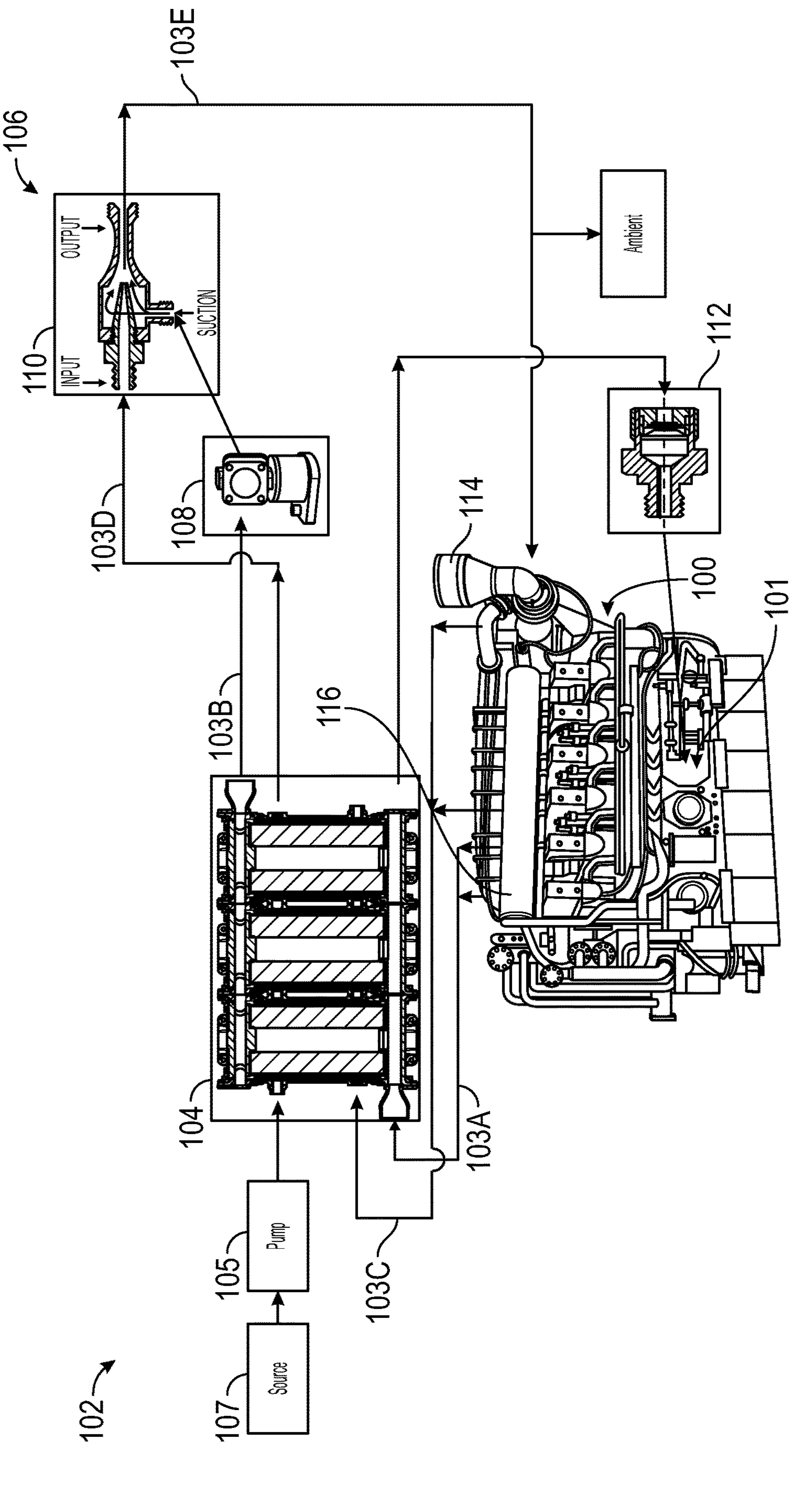
FIG. 1 is schematic illustration depicting an example internal combustion engine with a system including a blow-by gas oil separation device in accordance with an example of the present application.

FIG. 1 depicts an example schematic illustration of an engine 100 in accordance with this disclosure. The engine 100 can be used for power generation such as for the propulsion of vehicles or other machinery. The engine 100 can include various power generation platforms, including, for example, an internal combustion engine, whether gasoline, natural gas, dynamic gas blending, or diesel. It is understood that the present disclosure can apply to any number of piston-cylinder arrangements and a variety of engine configurations including, but not limited to, V-engines, inline engines, and horizontally opposed engines, as well as overhead cam and cam-in-block configurations.

In some applications, the internal combustion engines disclosed here are contemplated for use in gas compression. Thus, the internal combustion engines can be used in stationary applications in some examples. In other applications the internal combustion engines disclosed can be used with vehicles and machinery that include those related to various industries, including, as examples, oil exploration, construction, agriculture, forestry, transportation, material handling, waste management, etc.

The engine 100 can include a system 102 with at least one oil separation device 104 (or an array of a plurality of oil separation devices 104 as shown). The system 102 can include auxiliary components 106 to the engine 100 such as a regulator 108, jet pump 110 and a check valve 112. The check valve 112 can be placed, for example, at the bottom of the oil drain sub-system to prevent unfiltered blow-by gas from bypassing a coalescing filter of the oil separation device 104 and passing directly to a compressor 114. Thus, the check valve 112 can regulate the flow of oil.

In the example of FIG. 1, the system 102 can be part of the original manufacture of the engine 100 or can be a retrofitted system that is added to the engine 100 during maintenance, upgrade or the like. As will be discussed in further detail subsequently, the system 102 can use the oil separation device(s) 104 to filter oil from the blow-by gas to reduce volatile content in the blow-by gas.

The system 102 can be part of a purge system, which can be in fluid communication with a crankcase 101 of the engine 100 such as via an inlet passageway. The system 102 can be configured to supply air to the crankcase and through the engine block or through other components (not shown) to a cylinder head of the engine 100. The air the system 102 supplies can act to ventilate the crankcase 101 and other components of the engine 100 such as the cylinder head, the rocker box, etc. This ventilation, in addition to operation of the oil separation device(s) 104 to separate oil from the blow-by gas, can dilute un-combusted fuel, explosive gases and/or volatiles below a lower explosive limit so as to prevent or reduce the likelihood of an explosion within the engine 100.

The system 102 can include connected passages (some specifically illustrated by arrows and numbered in FIG. 1) that are in fluid communication with various components of the system 102. Some components of the engine 100 such as the engine block, the crankcase 101, the cylinder head, the rocker box, the valve cover and/or the breather can be in fluid communication. The terms “passage”, “passages”, “passageway”, “passageways”, “line” or “lines” as used herein should be interpreted broadly. These terms can be features defined by the various components of the engine illustrated in the FIGURES or can be formed by additional components (e.g., a hose, tube, pipe, manifold, cavity etc.) as known in the art. These additional components can be external to the engine 100 in some examples. Passageways can also connect the regulator 108, the jet pump 110 and the check valve 112 with selected parts of the oil separation device(s) 104 as further described herein.

The system 102 can include passages and other components such as those shown in FIG. 1. Dirty blow-by gas containing oil and volatiles of the system 102 can pass along a passage 103A from a breather or other device of the engine 100 and can pass to the oil separation device(s) 104 for filtering of oil to reduce volatile content of the blow-by gas. The blow-by gas, after filtering of the oil, can pass from the oil separation device(s) 104 along passage 103B to the regulator 108 (e.g., a vacuum control valve, mechanical valve or similar regulating device) located between the oil separation device(s) 104 and the jet pump 110. The blow-by gas can pass from the regulator 108 to the suction of the jet pump 110. The regulator 108 (e.g., the vacuum control valve) can be in fluid communication with the blow-by gas. The regulator 108 can be configured to regulate a flow of the blow-by gas to control a vacuum of the jet pump 110.

In tandem with the blow-by gas, the system 102 can utilize boost air from the compressor 114 (or other component such as a turbocharger) and/or air from an aftercooler 116, which moves along passage 103C. This boost air can be mixed in a desired ratio and passed through one or more jackets of the oil separation device(s) 104. Such arrangement can keep the filter of each of the oil separation device(s) 104 at between about 80 degrees Celsius and 120 degrees Celsius, for example. The boost air can be mixed to achieve a temperature range above the dew point temperature of the blow-by gas and below a temperature at which one or more components of the oil separating apparatus become inoperable (fail due to melting or other modality). However, other examples contemplate the use of alternative fluids, fluid temperatures and/or other configurations for the system 102. For example, the system 102 can utilize another fluid such as engine coolant or engine lube oil can be circulated by a pump 105 from a source 107 to the jacket of the oil separating apparatus 104.

After leaving the jacket(s), the boost air, now at a reduced pressure and temperature from a pressure and temperature leaving the engine 100, can pass along passage 103D to an input of the jet pump 110. The jet pump 110 can use the boost air as motive air for drawing the blow-by gas through the oil separation device(s) 104. The blow-by gas after leaving the oil separation device(s) 104 can be routed to a suction port of the jet pump 110. The boost air can be routed to an inlet port of the jet pump 110. The blow-by gas and the boost air can be combined in the jet pump 110. In particular, jet pump 110 can be configured to pass the blow-by gas and the boost air through a venturi of the jet pump 110. Some or all of the combined motive air and blow-by gas can pass along passage 103E to be returned to the engine 100, for example as an inlet to the compressor 114. Some or all of the combined motive air and blow-by gas can also be routed to ambient. The air can pass to the compressor 114, which can be configured to receive and compress the air. The compressed air can pass from the compressor 114 to the aftercooler 116. Thus, the aftercooler 116 can be in fluid communication with the compressor 114. The aftercooler 116 can be configured to receive and cool at least a portion of the compressed air.

To briefly summarize, the crankcase 101 can having a blow-by gas passing therethrough. The oil separation device(s) 104 can be in fluid communication with the blow-by gas and configured to separate oil from the blow-by gas. A mass flow rate of the boost air can be between 0.5% and 2.5% of a mass flow rate of the air received by the compressor 114. The boost air can be passed through the oil separation device(s) 104 in a heat exchange relationship with the blow-by gas to maintain a temperature of the blow-by gas within the oil separation device(s) 104 at a desired temperature range. The system 102 can include the jet pump 110 can be in fluid communication with both the blow-by gas after leaving the oil separation device(s) 104 and the boost air after leaving the oil separation device(s) 104. The jet pump can be configured to combine the blow-by gas and the boost air. After leaving the jet pump, the combined blow-by gas and the boost air can be routed to at least one of the compressor 114 or ambient.

Put another way, the system 102 can be configured to ratio compressor outlet boost air with aftercooler output air. This ratio of air can target a temperature somewhere between 80 degree Celsius to 120 degrees Celsius. Thus, the compressed air from the compressor 114 and cooled air from the aftercooler 116 can be mixed to achieve boost air at a temperature range of between 80° C. and 120° C., inclusive. This mixture of air can be fed to the jacket of each of the oil separation device(s) 104 the keep the filter of each of the oil separation device(s) 104 at between about 80 degrees Celsius and 120 degrees Celsius, for example. This mixture of air, after passing through the jacket of the oil separation device(s) 104, can be fed to the jet pump 110 as motive air. Passage of the motive air through the jet pump 110 can create a vacuum that can be modulated by the regulator 108 (e.g., vacuum control valve or a mechanical valve). The regulator 108 can modulate the vacuum at the outlet of the system 102 and can regulate crankcase pressure (via flow of blow-by gas to the suction of the jet pump 110). Additionally, the filter(s) of the oil separation device(s) 104 is heated, cooled or maintained at a desired temperature using the boost air.

Figure 2:
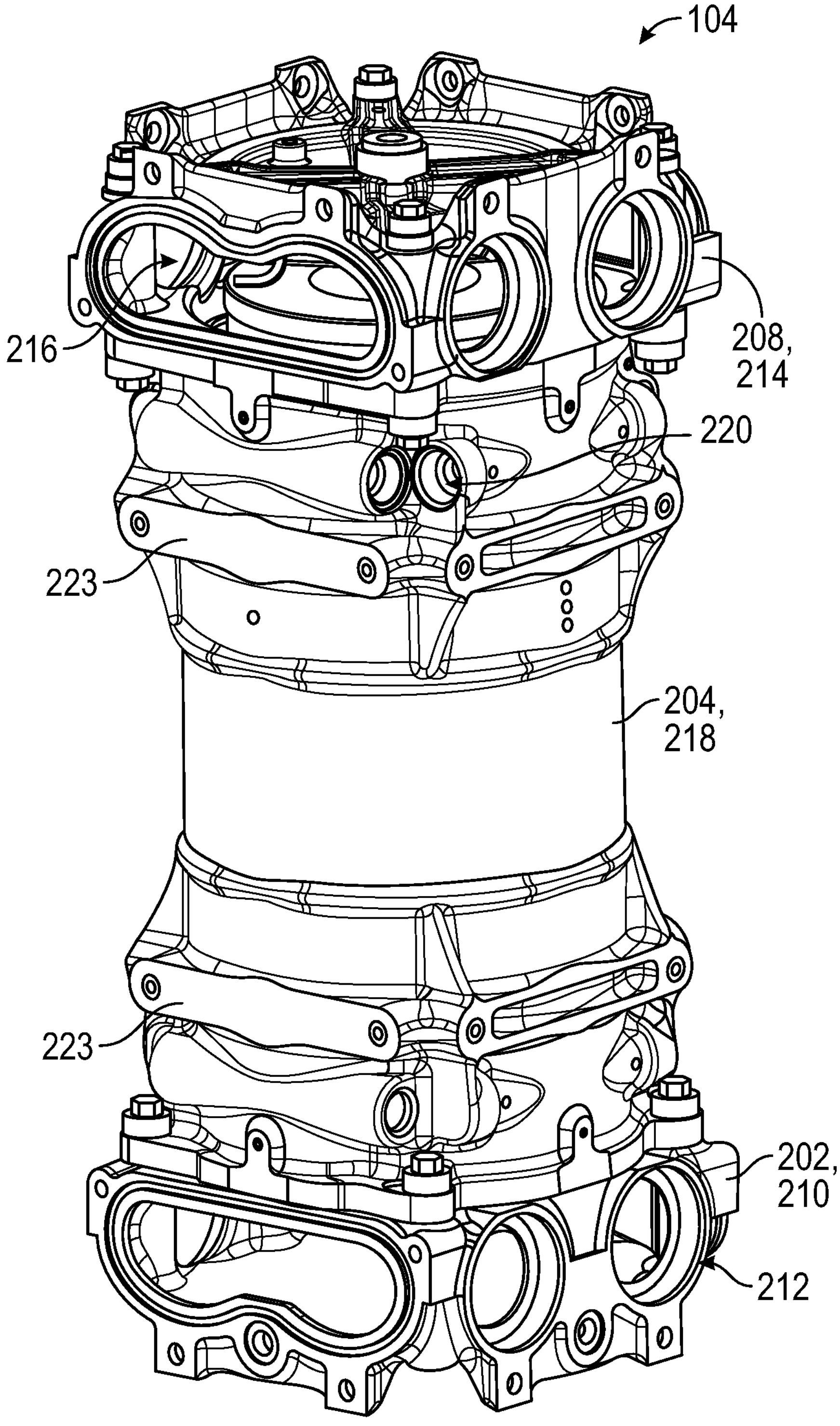
FIG. 2 is a perspective view of the oil separation device according to one example of the present application.
Figure 3:
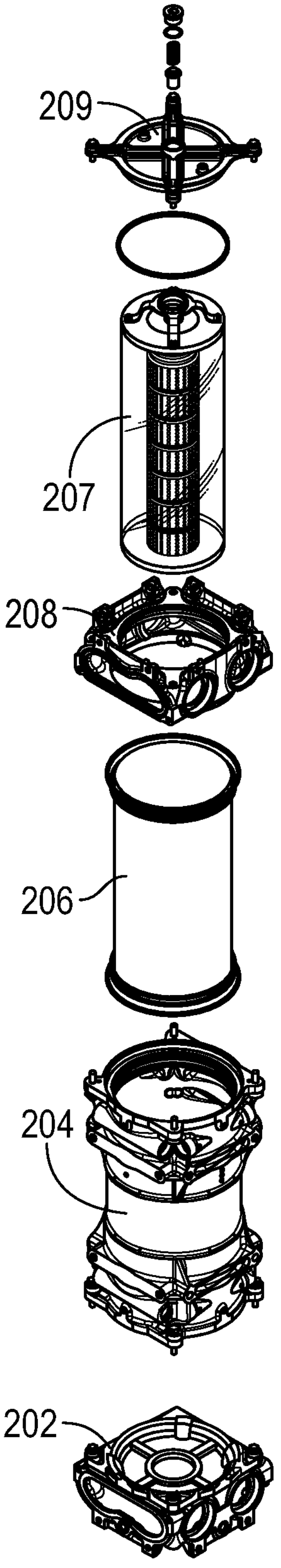
FIG. 3 is an exploded view of components of the oil separation device of FIG. 2.

FIG. 2 shows an example of the oil separation device 104 that can be used with the system 102 described previously. FIG. 3 shows an exploded view of components of the oil separation device 104. As shown in FIG. 3, the oil separation device 104 can include an inlet manifold 202, an outer housing 204, an inner housing 206, a coalescing filter 207, an outlet manifold 208 and a cover 209.

Referring now to FIG. 2, the inlet manifold 202 can include a main body 210 and one or more ports 212. As shown in FIG. 2, the outlet manifold 208 can include a main body 214 and one or more ports 216. Selective of the one or more ports 212 and/or one or more ports 216 can be blocked from receiving or outleting blow-by gas with a cover, plug, plate or other feature to close the respective port according to some examples.

As shown in FIG. 2, the inlet manifold 202 can be connected to a first end portion of the outer housing 204 by fastener, weld, solder, threading or other mechanical connection as known in the art. Similarly, the outlet manifold 208 can be connected to a second end portion of the outer housing 204 in a similar manner to the inlet manifold 202. The second end portion can generally oppose the first end portion.

The inlet manifold 202 and/or the outlet manifold 208 can be part of the outer housing 204 according to further examples rather than being a separate component. For example, the outer housing 204, the inlet manifold 202 and/or the outlet manifold 208 could comprise an integral single piece assembly according to some examples. The present application can refer to the inlet manifold 202 and the outlet manifold 208, the cover and other components as a "housing" for simplicity herein with the understanding that the term housing as used herein broadly refers to not just the inner housing 206 and outer housing 204 but also the inlet manifold 202, the outlet manifold 208, the cover 209 and/or other components that are not the coalescing filter 207. Similarly, terms like "upper", "lower", "top", "bottom" are relative terms not absolute terms. The orientation of the oil separation device 104 can vary from the exemplary orientation illustrated.

The inlet manifold 202 and the outlet manifold 208 can have a square, rectangular, circular, pentagon, quadrilateral, hexagon, octagon, or other shape in cross-section as desired and can be constructed of any suitable material(s). The main body 210 can form exterior walls, faces, one or more manifolds and other features of the inlet manifold 202. In brief, the main body 210 can be configured to form the one or more ports 212 for communication of blow-by gas into or out of the oil separation device 104. Although not specifically shown, an insulative material can abut or be in close proximity to and extend over one or more sides of the main body 210 such as at an end thereof. The insulative material can be held in place with mechanical fasteners, a plate and/or other feature or components. According to one example, the insulative material can be a fiberglass insulation encapsulated within a stainless steel foil, or a steel outer shell with an integral foam insulative underlayer.

The outer housing 204 can have a hollow tubular shape, for example. This shape can form an inner cavity configured to receive the inner housing 206. Thus, the inner housing 206 can be positioned within the outer housing 204. The inner housing 206 and the outer housing 204 can be constructed of suitable material(s). Although the outer housing 204 and the inner housing 206 are illustrated as separate components in the FIGURES, it is contemplated in some examples that these could be integrally formed as a single piece such as by casting or another forming technique. Referring to FIG. 2, the outer housing 204 can form a wall 218 with ports 220 passing through the wall 218. These ports 220 can provide inlet(s) or outlet(s) as desired and can be in fluid communication with a jacket 222 (discussed and illustrated further in FIG. 10). The ports 220 can be located at specifically configured flanges 223 or other features of the outer housing 204. The flanges 223 can form different faces of the outer housing 204. These faces of the outer housing 204 can correspond with faces of the inlet manifold 202 and/or the outlet manifold 208, for example.

The main body 214 can form exterior walls, faces, one or more manifolds and other features of the outlet manifold 208. The main body 214 can be configured to form the one or more ports 216 for communication of blow-by gas into or out of the oil separation device 104. The cover 209 can be configured to couple with the main body 214 and can be selectively removable therefrom. The cover 209 can allow access to an inner cavity (formed by the inner housing 206) and the coalescing filter 207. The coalescing filter 207 can be removed and changed for a new filter with selective removal of the cover 209 from the main body 214. This process is further illustrated and described in FIGS. 11A-11D. An insulative material can abut or be in close proximity to and extend over one or more sides of the main body 214 and the cover 209. The insulative material can be held in place with mechanical fasteners, a plate and/or other features or components in a manner similar to that if the insulative material of the inlet manifold 202.

Figure 4:
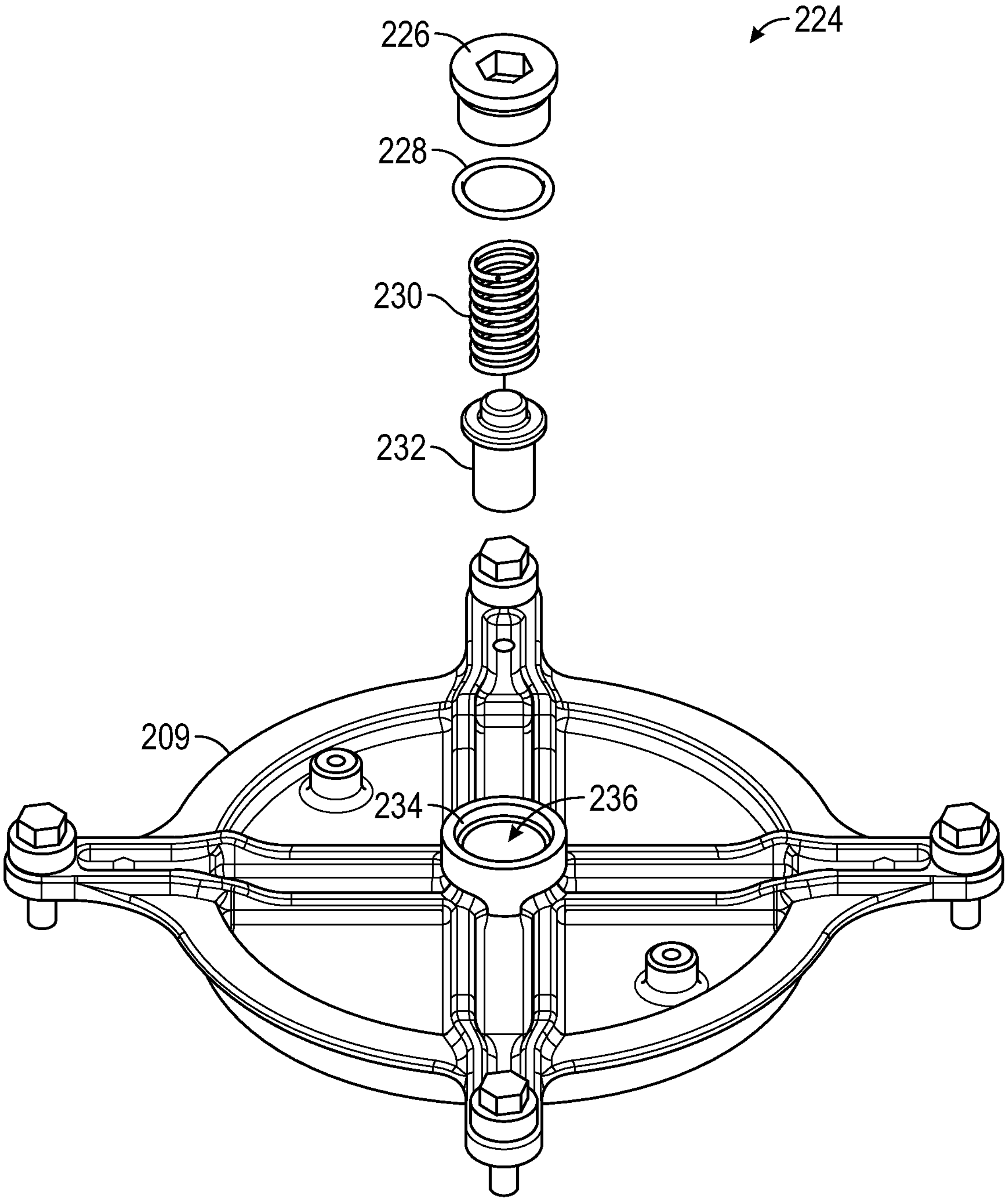
FIG. 4 is a cover of a housing of the oil separation device of FIGS. 2 and 3 and an exploded view of components of an upper filter support assembly according to one example of the present application.

FIG. 4 is an exploded view that further details of the cover 209 and part of an upper filter support assembly 224 of the oil separation device 104. The upper filter support assembly 224 can include a STOR plug 226, a seal 228, a spring 230 and a plunger 232.

The cover 209 can be constructed of suitable material(s) such as metal or metal alloy(s) similar to those of the main body 214 (FIG. 2). The cover 209 can be connected to the main body 214 (FIG. 2) by suitable mechanical attachment such as fasteners. The cover 209 can be configured to received the parts of the upper filter support assembly 224 shown in FIG. 4 via a projection 234 (only a portion of which is shown in FIG. 4) having a receptacle 236. The STOR plug 226, the seal 228, the spring 230 and the plunger 232 are configured to be insertable or partially insertable into the receptacle 236 of the projection 234 as further discussed and illustrated in regards to FIG. 10A. Thus, the receptacle 236 receives the spring 230, the plunger 232, the seal 228 and part of the STOR plug 226.

Figure 5:
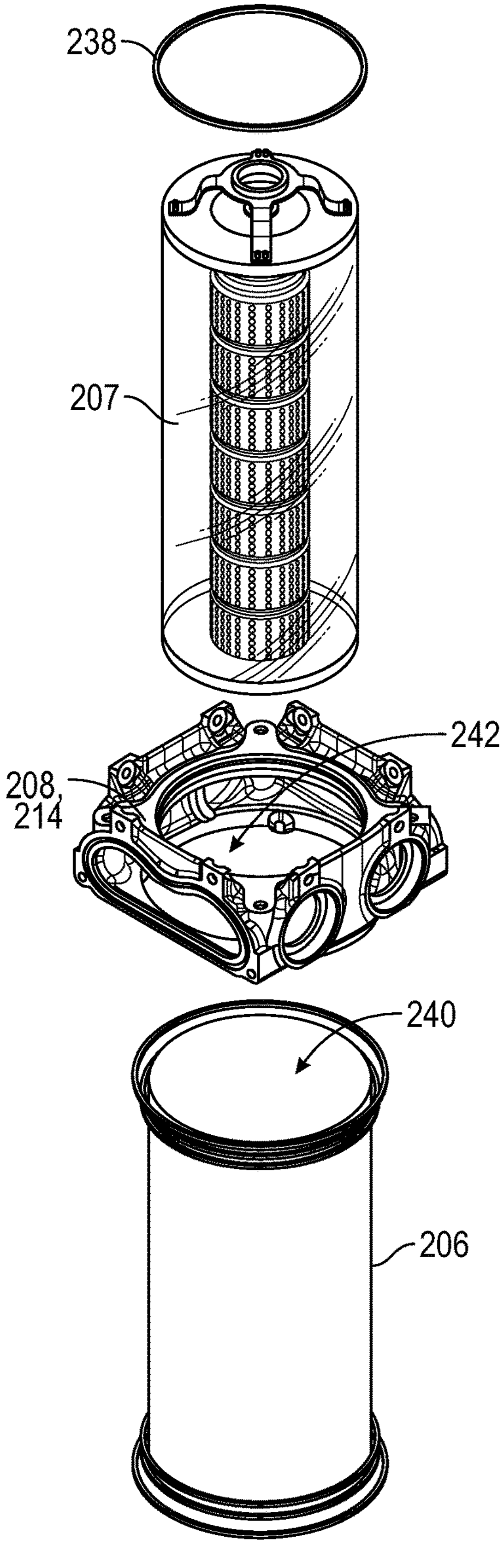
FIG. 5 is an exploded view of some components of the oil separation device of FIGS. 2 and 3 including seals, a coalescing filter, an outlet manifold and an inner housing according to an example of the present application.

FIG. 5 is an exploded view of further components of the oil separation device 104 including the inner housing 206, the coalescing filter 207, the outlet manifold 208 and a seal 238.

The outlet manifold 208 can couple to the outer housing 204 so as to be in close proximity to but spaced from the coalescing filter 207. The inner housing 206 can be positioned within the outer housing 204 (FIGS. 2 and 3) and can be sealed thereto. The inner housing 206 can comprise a sleeve having a hollow construction forming an inner cavity 240 for receiving the coalescing filter 207.

As shown in 5, the outlet manifold 208, specifically the main body 214, can form a cavity (manifold) 242 internally. The cavity 242 can be in fluid communication with the one or more ports 216 for outflow of blow-by gas after being filtered by the coalescing filter 207. The outlet manifold 208, in particular the main body 214, can include a central port that is part of the cavity 242 that allows for passage of the coalescing filter 207 into the inner cavity 240 of the inner housing 206. The cover 209 (FIG. 4) can be configured to couple with the main body 214 and can be sealed thereto with the seal 238 as further illustrated and discussed subsequently.

Figure 6:
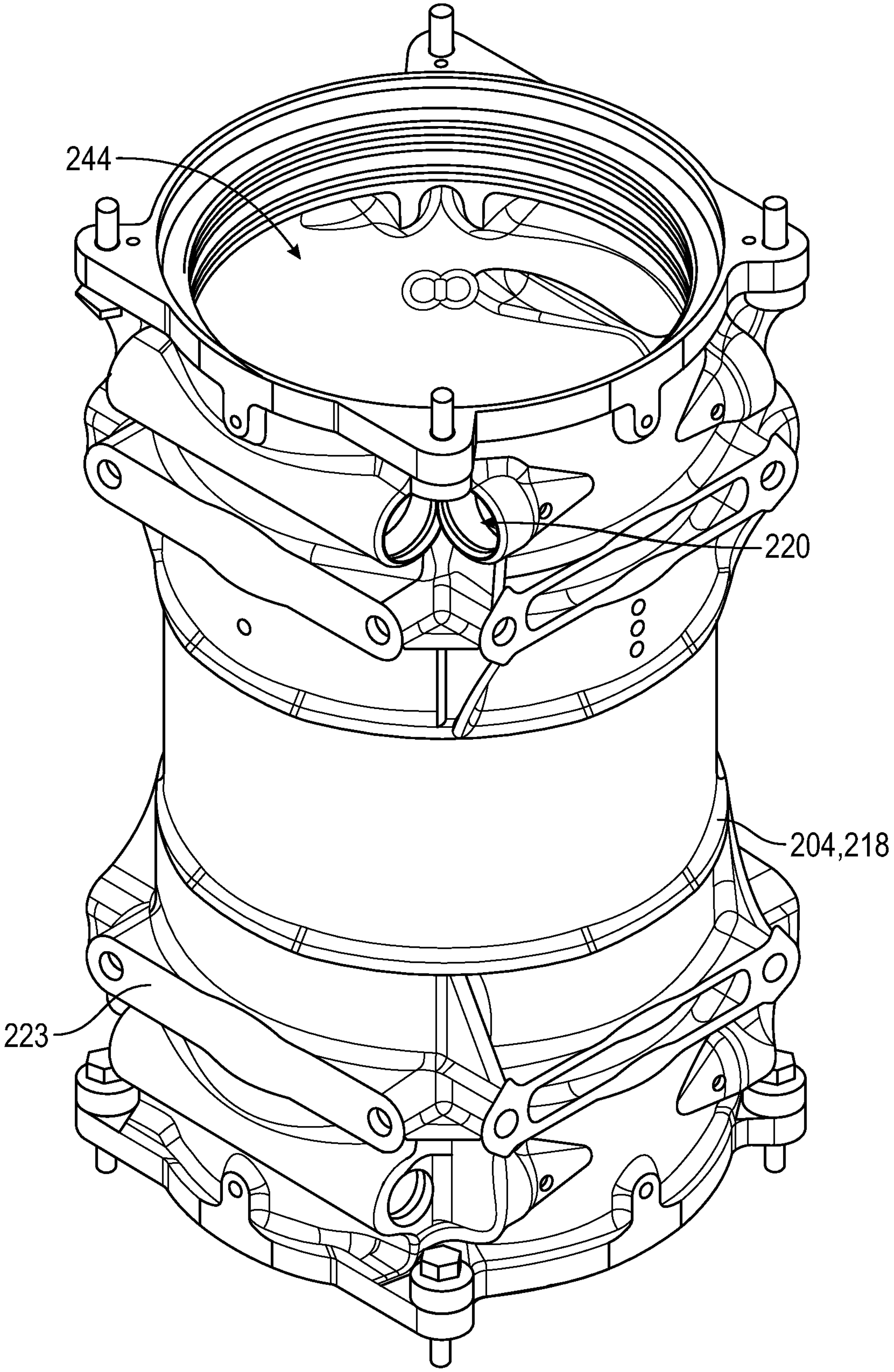
FIG. 6 is a perspective view of an outer housing of the oil separation device of FIGS. 2 and 3 according to an example of the present application.

FIG. 6 is a perspective view of the outer housing 204. The housing 204 can have a hollow tubular shape, for example. This shape can form an inner cavity 244 configured to receive the inner housing 206 (FIG. 5). Thus, the inner housing 206 (FIG. 5) can be positioned within the outer housing 204. The outer housing 204 can be constructed of suitable material(s). The outer housing 204 can additionally include the wall 218, the ports 220 and the flanges 223 as discussed previously.

Figure 7:
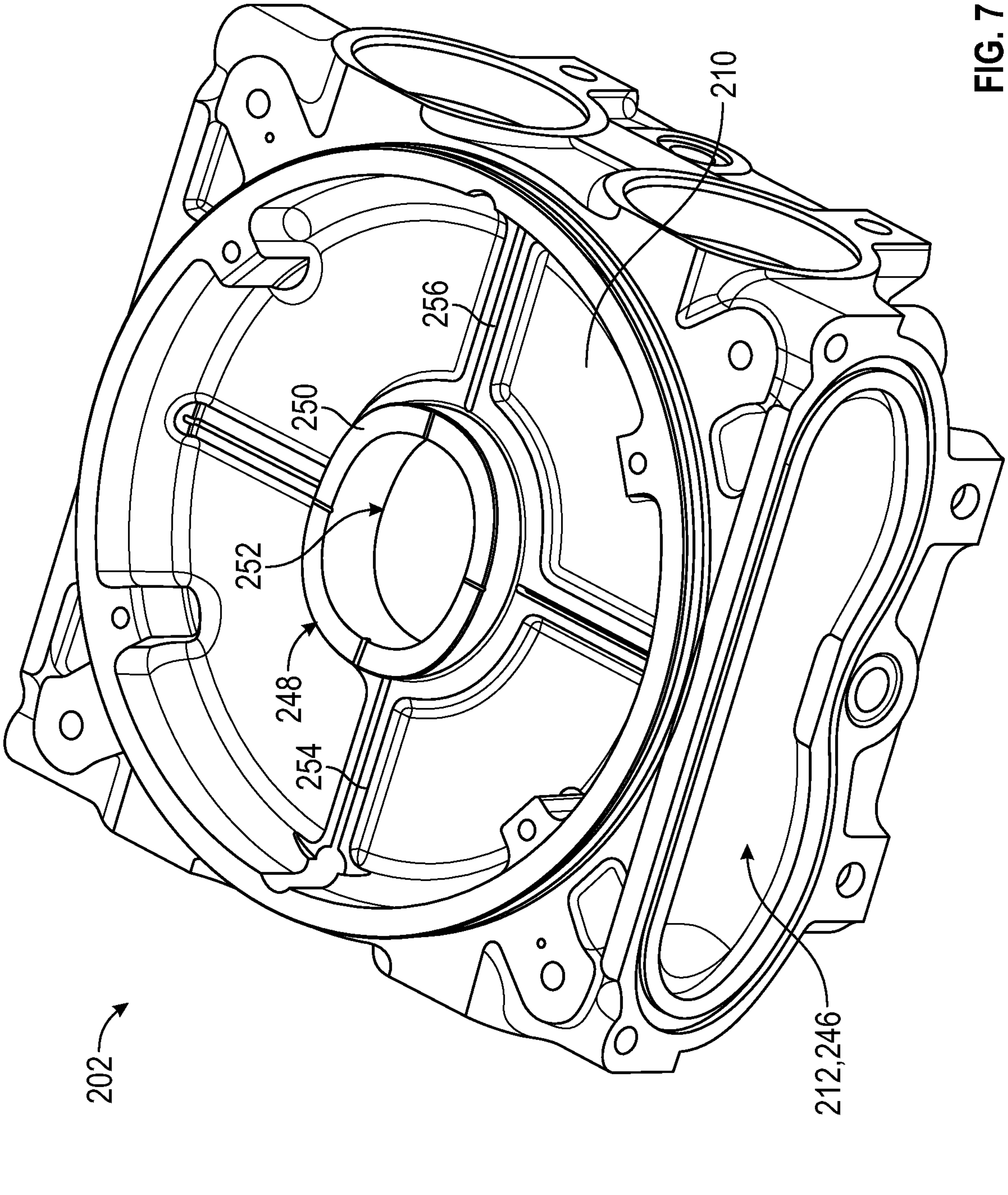
FIG. 7 is a perspective view of an inlet manifold of the oil separation device of FIGS. 2 and 3 according to an example of the present application.

FIG. 7 is a perspective view particularly illustrating a top of the inlet manifold 202. The inlet manifold 202 can include the main body 210 and the one or more ports 212 as discussed previously. The inlet manifold 202 can additionally include a lower cavity 246 and a lower filter support 248. The lower filter support 248 can include a filter interface 250 with a port 252, ridges 254 and reliefs such as grooves 256.

The lower cavity 246 can be defined by the main body 210 and can have the one or more ports 212 as inlets (or outlets) and the port 252 as an inlet or outlet thereto. The main body 210 can form an upper wall of the inlet manifold 202 and the lower filter support 248 can be positioned along a top of the inlet manifold 202. The filter interface 250 can be a centralized projection extending above the upper wall of the main body 210. The filter interface 250 can form the port 252. The ridges 254 can projection from the upper wall of the main body 210. The ridges 254 can extend outward away from the filter interface 250 in several directions toward outer sides of the inlet manifold 202. The filter interface 250 and/or the ridges 254 can include the grooves 256 extending there along.

The inlet manifold 202 is configured to allow for fluid communication between the lower cavity 246 and a central cavity of the coalescing filter 207 (FIG. 5) as further discussed and illustrated. In particular, blow-by gas can enter the lower cavity 246 from any direction via the one or more ports 212 defined by the main body 210. The blow-by gas can pass from the lower cavity 246 through the lower filter support 248 via the port 252 to the coalescing filter 207.

Figure 7A:
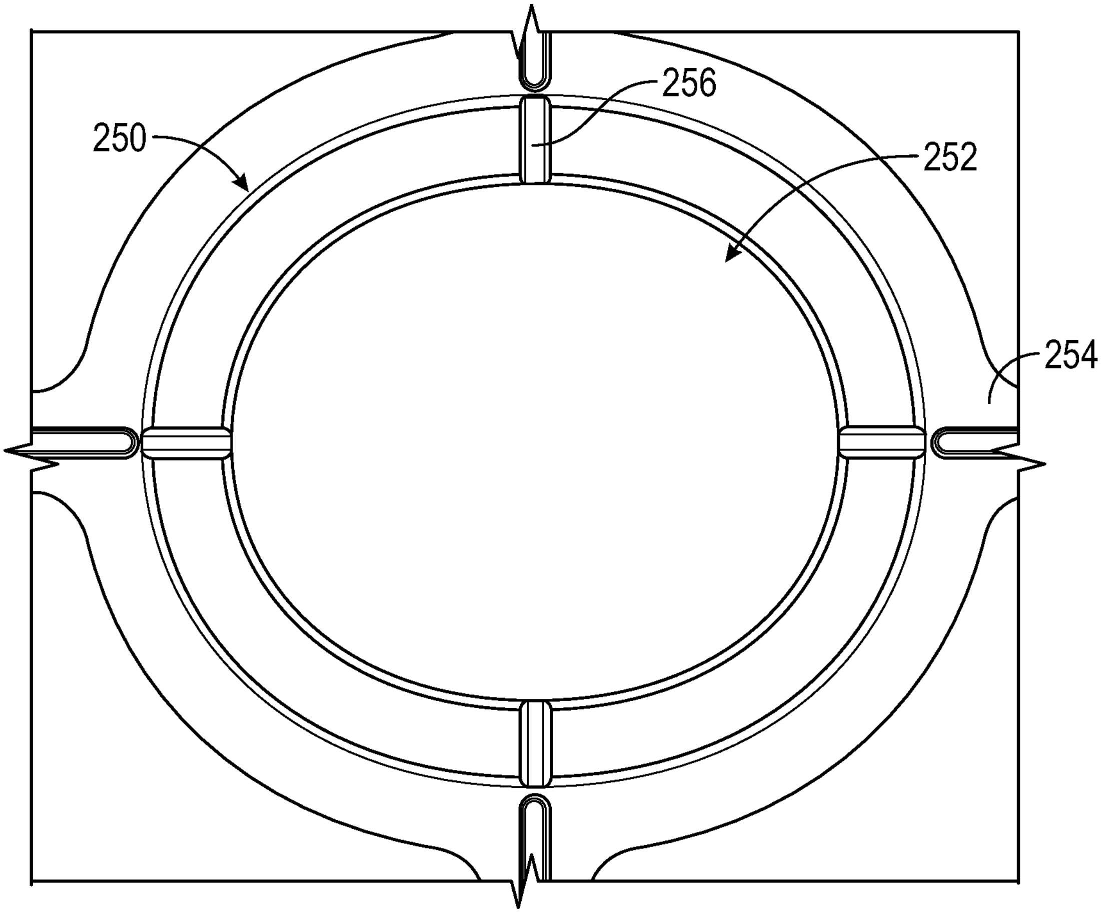
FIG. 7A is a plan view of a lower filter support of the inlet manifold of FIG. 7.
Figure 7B:
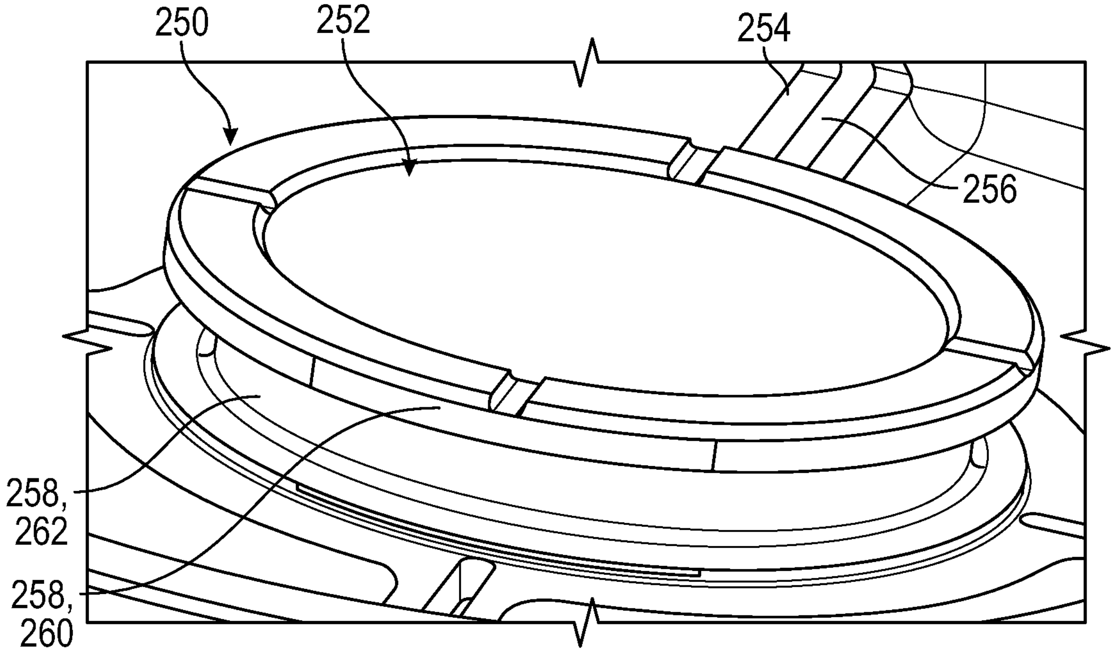
FIG. 7B is an enlarged perspective view of the lower filter support of the inlet manifold of FIG. 7.

FIGS. 7A and 7B show the filter interface 250 with the port 252, the ridges 254 and the grooves 256 in further detail. As shown in FIG. 7A, the filter interface 250 can have a non-circular shape in cross-section. This non-circular shape can be an oval, elliptical, oblong, square, rectangular, pentagon, quadrilateral, hexagon, octagon, etc. As a result of the non-circular shape of the filter interface 250, the port 252 can be non-circular (e.g., oval, elliptical, oblong, square, rectangular, pentagon, quadrilateral, hexagon, octagon, etc.).

FIG. 7B shows the filter interface 250 in perspective. The filter interface 250 can have an outer side 258 with an lip 260 and a groove 262. The lip 260 can project outward of the groove 262. Although the filter interface 250 is shown as a feature of the inlet manifold 202 in FIGS. 7-7B, according to other examples the filter interface 250 can be a dedicated separate component (e.g., an adapter) configured to be coupled to the inlet manifold 202. The filter interface 250 can be attachable and removable from the inlet manifold 202 according to some examples.

Figure 8:
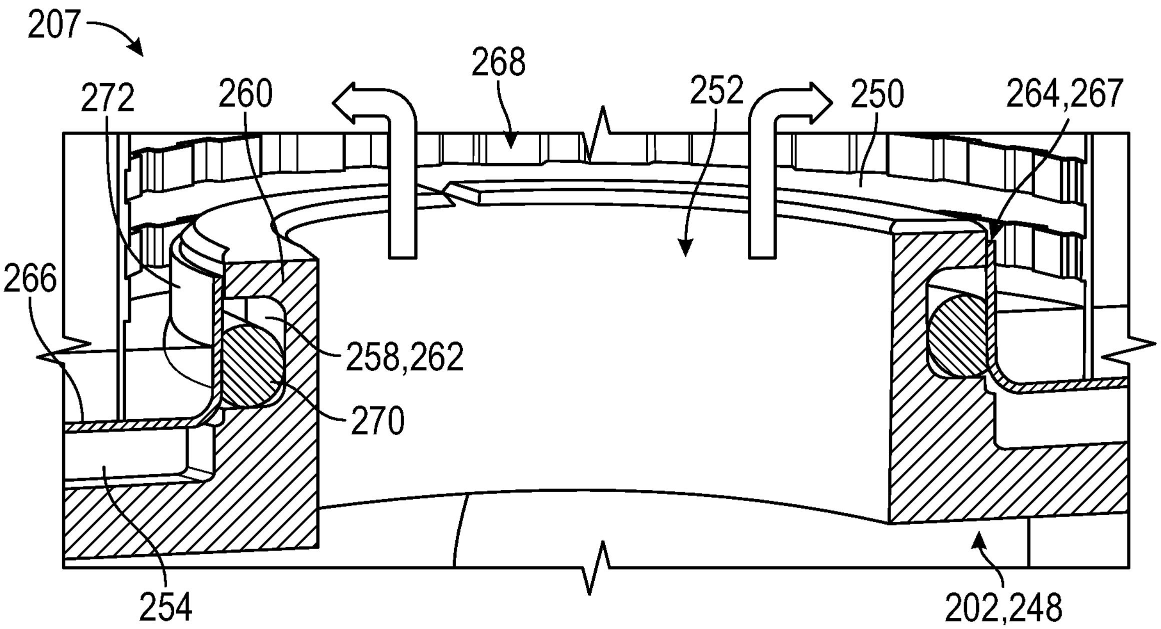
FIG. 8 is a cross-sectional view of the lower filter support of the inlet manifold engaging with a lower end cap of the coalescing filter according to an example of the present application.

FIG. 8 shows the inlet manifold 202, in particular the lower filter support 248, interfacing with and coupled to a lower part of the coalescing filter 207. The ridges 254 can act as stops (stand offs from the remainder of the inlet manifold 202) for a lower end cap 266 of the coalescing filter 207. The ridges 254 can position the coalescing filter 207 a desired distance from the remainder of the inlet manifold 202 such that the filter interface 250 is inserted a desired distance into the aperture 264 of the lower end cap 266. FIG. 8 shows the filter interface 250 inserted in and received by an aperture 264 of the lower end cap 266 of the coalescing filter 207. The aperture 264 can comprise an inlet port 267 communicating with a central cavity 268 of the coalescing filter 207.

A seal 270 can be received by the groove 262 at the outer side 258. The seal 270 can be an O-ring or other suitable seal construct, for example. The seal 270 can be captured by the lip 260 and a flange 272 of the lower end cap 266. The seal 270 can provide for a sealing interface between the inlet manifold 202 (the filter interface 250) and the coalescing filter 207. FIG. 8 illustrates as yet unfiltered blow-by gas passing through the port 252 of the filter interface 250 and being received by the inlet port 267 and the central cavity 268 of the coalescing filter 207. Due to the non-circular shapes of the filter interface 250 and the aperture 264 (see FIG. 9), the filter interface 250 (a projecting feature) when received in the aperture 264 constrains a rotation of the coalescing filter 207 relative to the housing (e.g., relative to the outer housing 204, the inner housing 206, the outlet manifold 208, and/or the cover 209, etc.).

Figure 9:
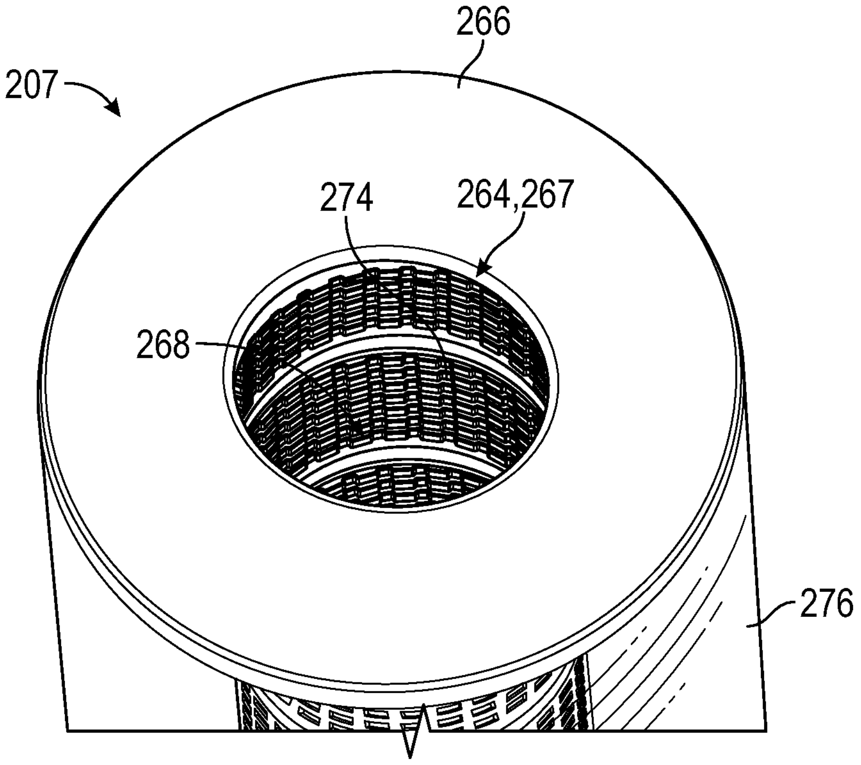
FIG. 9 is a perspective view of a portion of the coalescing filter showing the lower end cap according to an example of the present application.

FIG. 9 shows the lower portion of the coalescing filter 207 including the lower end cap 266 with the aperture 264 forming the inlet port 267, the central cavity 268, a core 274 and a filter media 276. As shown in FIG. 7, the aperture 264 defined by the lower end cap 266 can have a non-circular shape corresponding generally to that of the filter interface 250. Thus, the aperture 264 can be oval, elliptical, oblong, square, rectangular, pentagon, quadrilateral, hexagon, octagon, etc. in cross-section. The central cavity 268 can be circular or non-circular in cross-section. The central cavity 268 can be defined by the core 274. The coalescing filter 207 can have a generally cylindrical shape about the central cavity 268 and the core 274. The core 274 can be positioned within the filter media 276. The core 274 can comprise a thin formed cylindrical sheet having a plurality of apertures therein. These apertures communicate with the filter media 276. The coalescing filter 207 is configured to separate a portion of the oil contained in the blow-by gas. The coalescing filter 207 can be constructed using a single or multi-layer synthetic micro-glass fiber, synthetic fiber, or other coalescing filter media types known in the industry with the filter media 276 formed into a tube shape, wound around the core 274, or pleated and located around the core 274. The filter media 276 can be configured for coalescing of oil from oil mist of the blow-by gas. In addition to the filter media 276, the coalescing filter 207 can also include end caps such as the lower end cap 266 and an upper end cap (not shown). The end caps can be constructed of a thin sheet of rigid material that is bonded or otherwise coupled to the core 274 and/or the filter media 276. The material can be metal, metal alloy(s), suitable rigid and stable polymer or composites thereof. The coalescing filter 207 can be sealed to the overall housing with suitable associated seals. However, in some examples, the seal(s) are not provided pre-coupled to the coalescing filter 207 but are rather separate components insertable in the housing or are components of the housing. The core 274 and the filter media 276 can have an inner and outer perforated tube structure to provide the axial, torsional, and bending stiffness required for the application. Such stiffness can be reinforced by the end caps.

Figure 10:
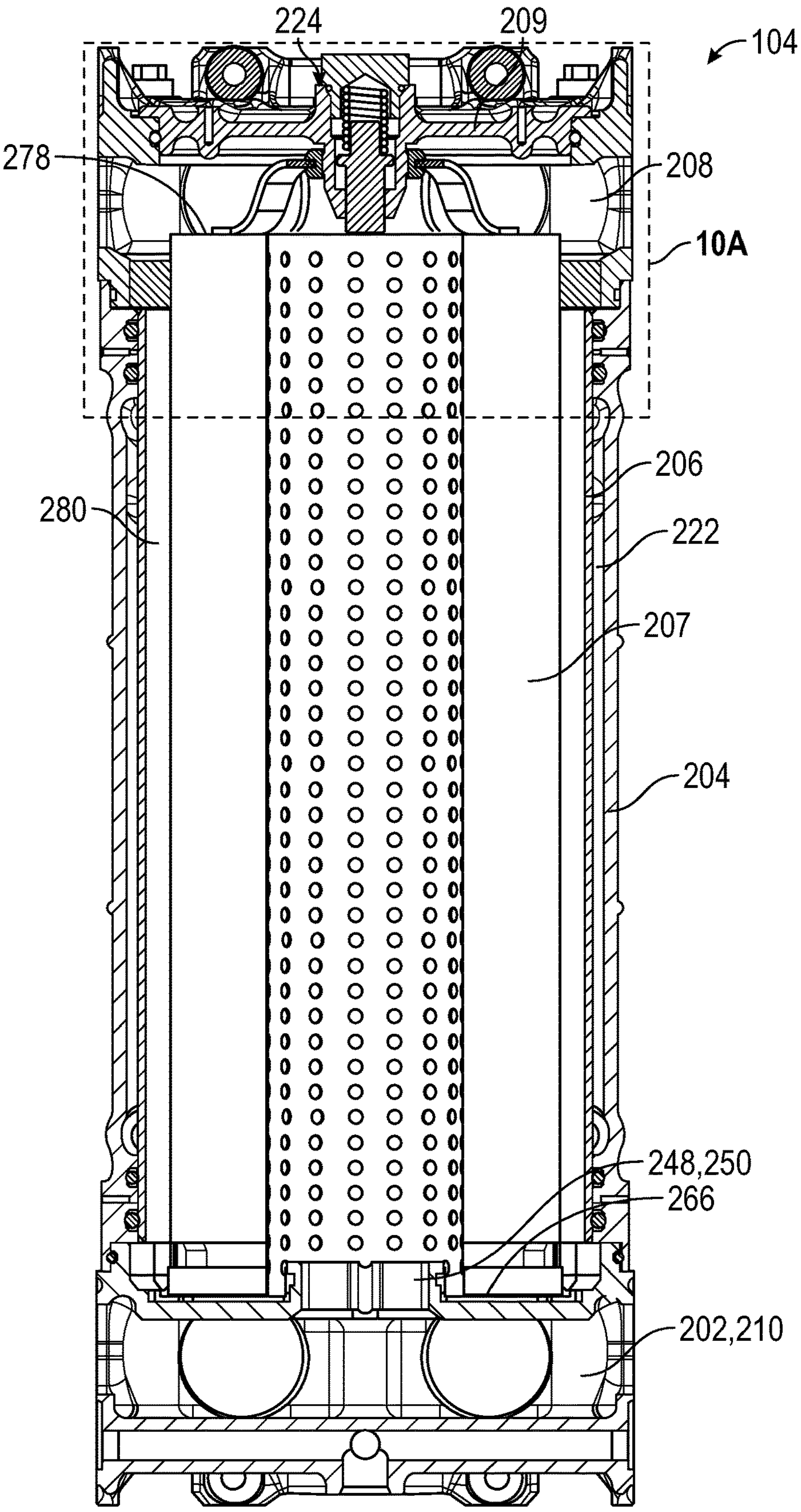
FIG. 10 is a cross-sectional view of the oil separation device of FIGS. 2 and 3.

FIG. 10 shows a cross-sectional view of the oil separation device 104. FIG. 10 shows the inlet manifold 202, the outer housing 204, the inner housing 206, the coalescing filter 207 including the lower end cap 266, the outlet manifold 208, the cover 209, the lower filter support 248 including the filter interface 250 as previously discussed. FIG. 10 additionally shows the upper filter support assembly 224 and an upper end cap 278. The upper end cap 278 can generally oppose the lower end cap 266 on a second axial end of the coalescing filter 207. Further components of the upper filter support assembly 224 are discussed in a regard to FIG. 10A.

Referring to FIG. 10, the inlet manifold 202 can receive blow-by gas containing oil. This blow-by gas can be passed through the filter interface 250 and into the coalescing filter 207 as previously discussed. The blow-by gas containing oil can pass radially outward through the coalescing filter 207 to an outer circumference thereof. During such passage, the configuration of the coalescing filter 207 can cause coalescing of the oil from the blow-by gas. Such coalescing can result in separation of the oil from the blow-by gas. The oil once coalesced can travel to the outer circumference of the coalescing filter 207 and can pass to an outer cavity 280 surrounding the outer circumference of the coalescing filter 207. The blow-by gas that is separated from the oil by action of the coalescing filter 207 can pass from the coalescing filter 207 into the outer cavity 280 and can pass from the outer cavity 280 into the outlet manifold 208. The outer cavity 280 can communicate with the outlet manifold 208 around substantially all (100% or 360 degrees), most (60%-99%), a majority (50%-59%), some (25%-49% or part (5%-24%) of the outer circumference of the coalescing filter 207. One or more passages can drain oil from the outer cavity 280 into the inlet manifold 202. The one or more passages can be at least partially formed by the main body 210 of the inlet manifold 202. The one or more passages can have an outlet port(s). This outlet port(s) can be located on one or more of the faces of the main body 210. The one or more passages can be configured to receive the oil captured (separated by action of) by the coalescing filter 207 and can pass the oil as a drainage out of the oil separation device 104 at the outlet port(s).

The jacket 222 is shown in FIG. 10. The jacket 222 can comprise a sealed (from the inner cavity, the blow-by gas, oil and from the coalescing filter 207) cavity formed between an interior side of the wall 218 of the outer housing 204 and an outer surface of the inner housing 206. Thus, the jacket 222 can be formed between the inner housing 206 and the outer housing 204. The jacket 222 can be cylindrically shaped having only the ports 220 for fluid communication. The jacket 222 can be configured to receive one or more of an electrical heater coil, an insulative material, a sealed air gap, or a positive mass flow of pressurized engine boost air, engine coolant, or engine lube oil. More particularly, electrically resistive heating coils can be placed in the jacket 222 so as to provide heating to the inner housing 206 and the coalescing filter 207. This can be useful if the oil separation device 104 is being operated in a cold environment. Alternatively or additionally, insulative material such as foam or the like can be placed in the jacket 222 to provide for insulation of the coalescing filter 207 (and blow-by gas) from a harsh environment. The jacket 222 can also receive in addition or alternative to the heating coil and/or insulation, a fluid that can be used for heating or cooling the coalescing filter 207 (and the blow-by gas). Such fluid can be anyone or combination of a sealed air gap, or a positive mass flow of pressurized engine boost air, engine coolant, or engine lube oil, for example. However, the fluid is not limited to these examples.

Figure 10A:
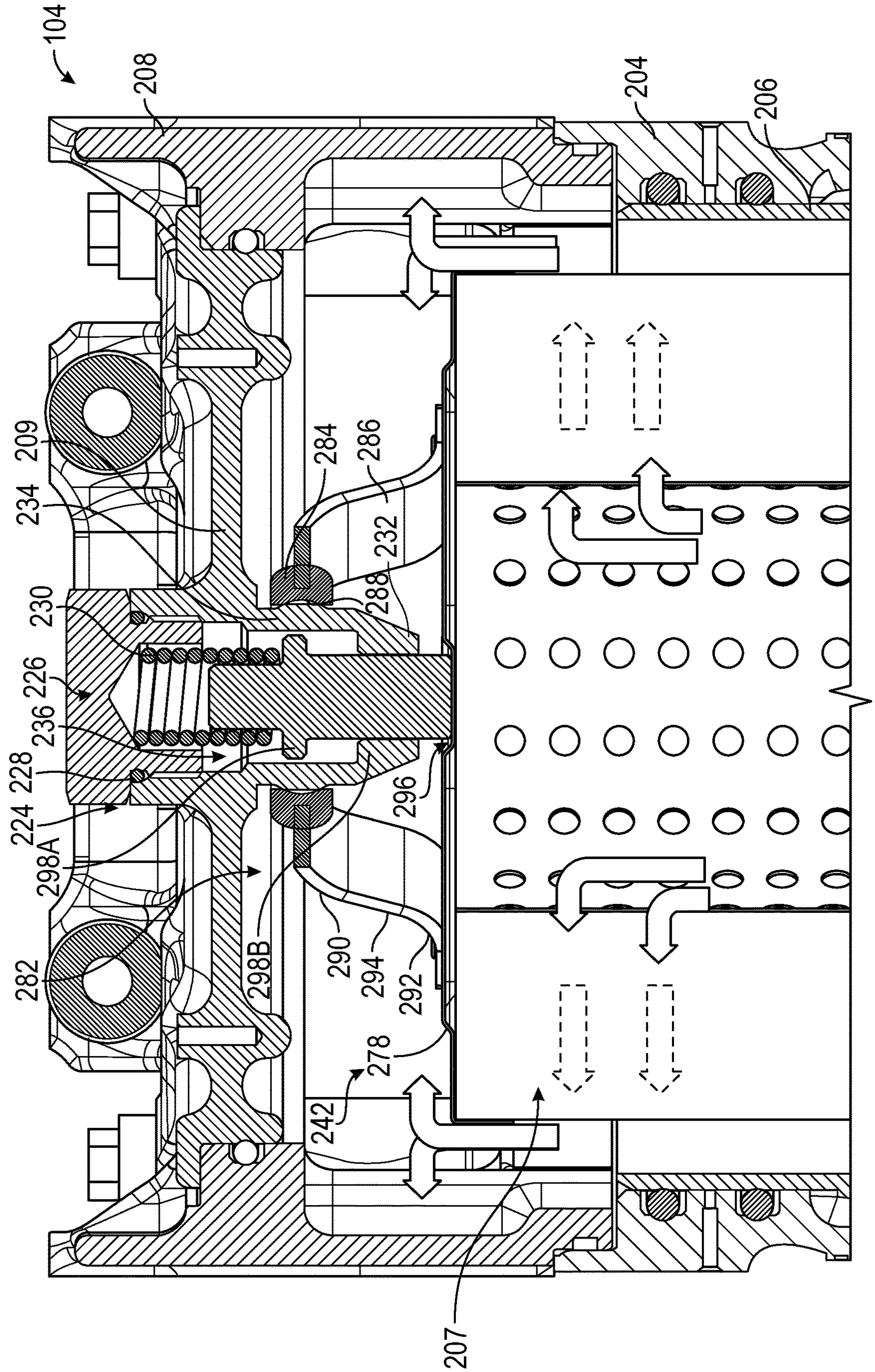
FIG. 10A is an enlarged cross-sectional view of an upper portion of the oil separation device of FIG. 10.

FIG. 10A is an enlarged cross-sectional view of an upper portion of the oil separation device 104 including an upper portion of the coalescing filter 207 including the upper end cap 278, the outer housing 204 and the inner housing 206. The outlet manifold 208, the cover 209 and the upper filter support assembly 224 are also illustrated. FIG. 10A illustrates with arrows exemplary flow pathways of the blow-by gas through the coalescing filter 207 along the upper end portion thereof to and through the outlet manifold 208.

As previously discussed in reference to FIG. 4 and also now shown in FIG. 10A, the upper filter support assembly 224 can include the STOR plug 226, the seal 228, the spring 230 and the plunger 232. Additionally, the upper filter support assembly 224 can include a coupling assembly 282. The coupling assembly 282 can include a grommet 284 and a plurality of arms 286.

The STOR plug 226 can engage the spring 230 and is fastened down into the receptacle 236 of the projection 234. The seal 228 can be located between the STOR plug 226 and the projection 234. The spring 230 can be received in the receptacle 236 and can engage the STOR plug 226 and the plunger 232. The plunger 232 can extend at least partially from the receptacle 236 and the projection 234. The plunger 232 can be biased by the spring 230.

The coupling assembly 282 can be attached to and can extend outward from the upper end cap 278. As further discussed and illustrated, the coupling assembly 282 can be configured to couple with the cover 209 such as in a telescopic receiving manner and is configured to position the coalescing filter 207 within the housing (e.g., relative to the outer housing 204, the inner housing 206, the outlet manifold 208, and/or the cover 209, etc.). Such positioning of the coalescing filter 207 can be relative to a centerline axis of the housing. Thus, according to one example a centerline axis of the coalescing filter 207 can be substantially aligned with the centerline axis of the housing by the coupling assembly 282.

The grommet 284 can have a thru-hole 288 configured to receive a lower portion of the projection 234 of the cover 209. The plurality or arms 286 can be coupled to the grommet 284 and can be coupled to the upper end cap 278. The plurality of arms 286 can be in a spaced relationship relative to one another (e.g., at 45, 90, 135 or 180 degree increments). The plurality of arms 286 can extend outward and downward from the grommet 284 to the upper end cap 278 such that the grommet 284 is spaced from the upper end cap 278. The shape and arrangement of the plurality of arms 286 can allow for an open frame construct for the coupling assembly 282 allowing for relatively uninhibited flow of the blow-by gas within the cavity 242 of the outlet manifold 208. In particular, the plurality of arms 286 can be spaced around the centerline axis of the coalescing filter 207 to provide for multiple flow paths of filtered blow-by gas through the outlet manifold 208 of the housing.

The plurality of arms 286 can be a stamping of metal, metal alloy(s) or other suitable material(s). The plurality of arms 286 can be connected to the upper end cap 278 by riveting, welding, adhesive, fastener or other suitable mechanical connection. As shown in FIG. 10A, one or more of the plurality of arms 286 can be curved in at least two different arcs. These two arcs can have a curvature in different directions (e.g., concave and convex). In particular, one or more of the plurality of arms 286 includes a first arcuately curved portion 290 and a second arcuately curved portion 292. The first arcuately curved portion 290 can be attached to or can be adjacent the grommet 284. The second arcuately curved portion 292 can be attached to or can be adjacent the upper end cap 278. The first arcuately curved portion 290 can be spaced from the second arcuately curved portion 292 by an intermediate portion 294. The intermediate portion 294 can be substantially straight (e.g., non-curved). The first arcuately curved portion 290 can have a first radius of curvature in a first direction with the first radius of curvature having an origin adjacent the grommet 284 generally spaced below the first acutely curved portion 290 of the at least one of the plurality of arms 286. The second arcuately curved portion 292 can have a second radius of curvature in a second direction with the second radius of curvature having an origin axially spaced from the upper end cap 278 at or adjacent an outer radially portion thereof. The origin can be located axially spaced above the second acutely curved portion 292 of the at least one of the plurality of arms 286.

The upper end cap 278 can include at least one of a ridge or a pocket 296 on an upper surface thereof that faces the coupling assembly 282. The ridge or the pocket 296 can be generally aligned with and positioned below the grommet 284, for example. The ridge or pocket 296 can be contacted by the plunger 232. As shown in FIG. 10A, the plunger 232 and spring 230 are inserted in the receptacle 236. The plunger 232 projects from the receptacle 236 a distance and is configured to engage the upper end cap 278 as biased by the spring 230. This configuration can cause axial compression loading of the coalescing filter 207 that can reduce vibration. Thus, the plunger 232, as biased by the spring 230, can reduce axial vibration of the coalescing filter 207 relative to the housing via engagement between the plunger 232 and the upper end cap 278. Additionally, the coupling assembly 282 via engagement with the projection 234, can constrain a radial movement of the coalescing filter 207 relative to the centerline axis of the housing to reduce vibration of the coalescing filter 207 in a radial direction. The configuration of the upper filter support assembly 224 can allow for some degree (e.g., 6 mm or less) of axial constrained movement of the coalescing filter 207 relative to the cover 209. The amount of radially constrained movement of the coalescing filter 207 can be relatively smaller than the degree of axial constrained movement of the coalescing filter 207. The degree of axial constrained movement of the coalescing filter 207 can be dictated by the force of the spring 230 and/or a position and/or thickness of flanges 298A and 298B of the plunger 232 and the projection 234. Together the flanges 298A and 298B form a stop to limit axial travel of the plunger 232.

Figure 11A:
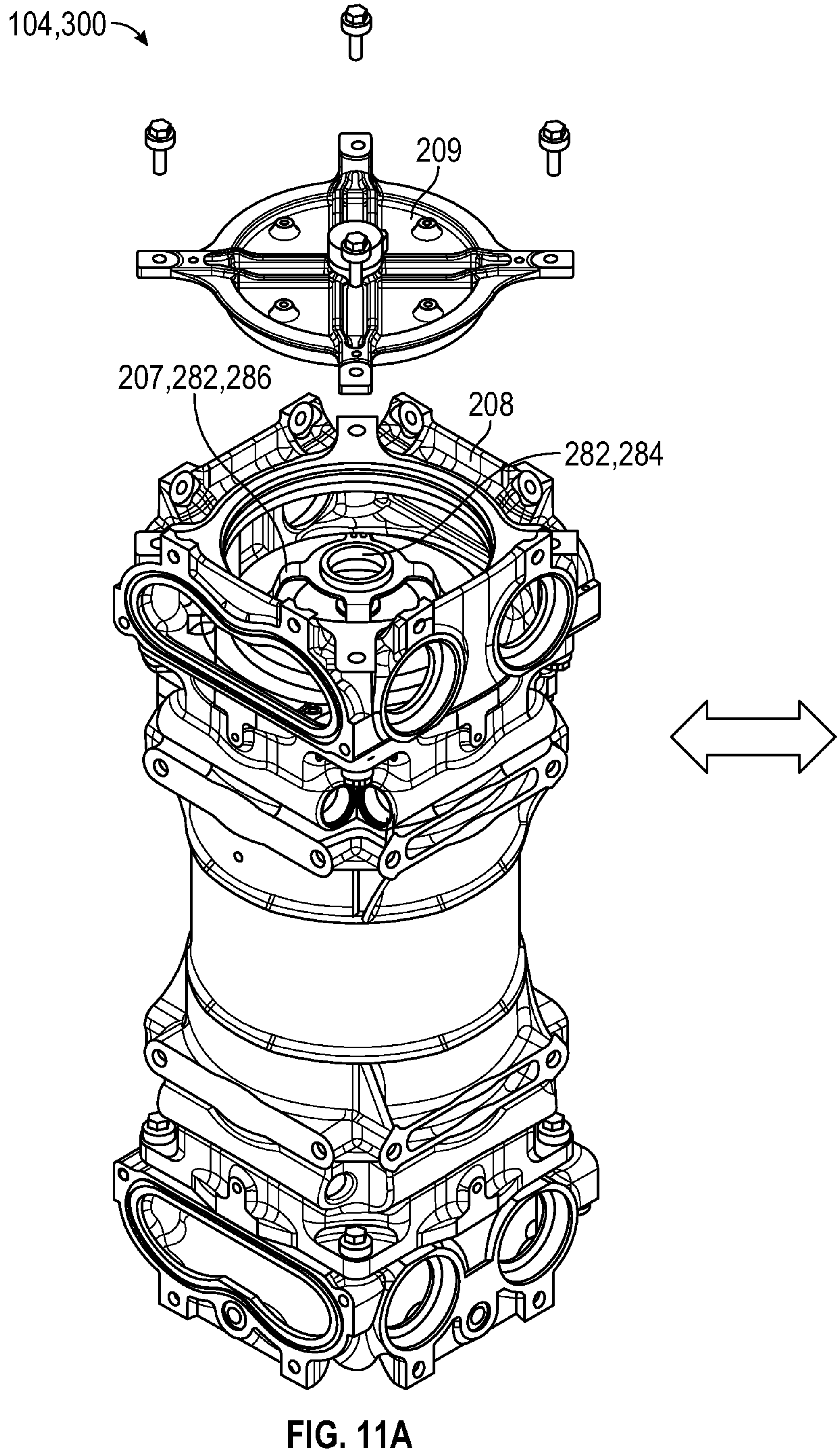
FIGS. 11A-11D illustrate a method of servicing the coalescing filter of the oil separation device according to an example of the present application.

FIGS. 11A-11D illustrate a method 300 of servicing the coalescing filter 207 from a housing (one or more parts of the oil separation device 104 other than the coalescing filter 207). The method 300 can include removing the cover 209 from the outlet manifold 208 to expose a top of the coalescing filter 207 as shown in FIG. 11A. Also, as shown in FIG. 11A, the coupling assembly 282 can be configured as a handle for insertion and removal of the coalescing filter 207 from the housing. This is because the grommet 284 and/or the plurality of arms 286 are readily accessible and graspable.

Figure 11B:
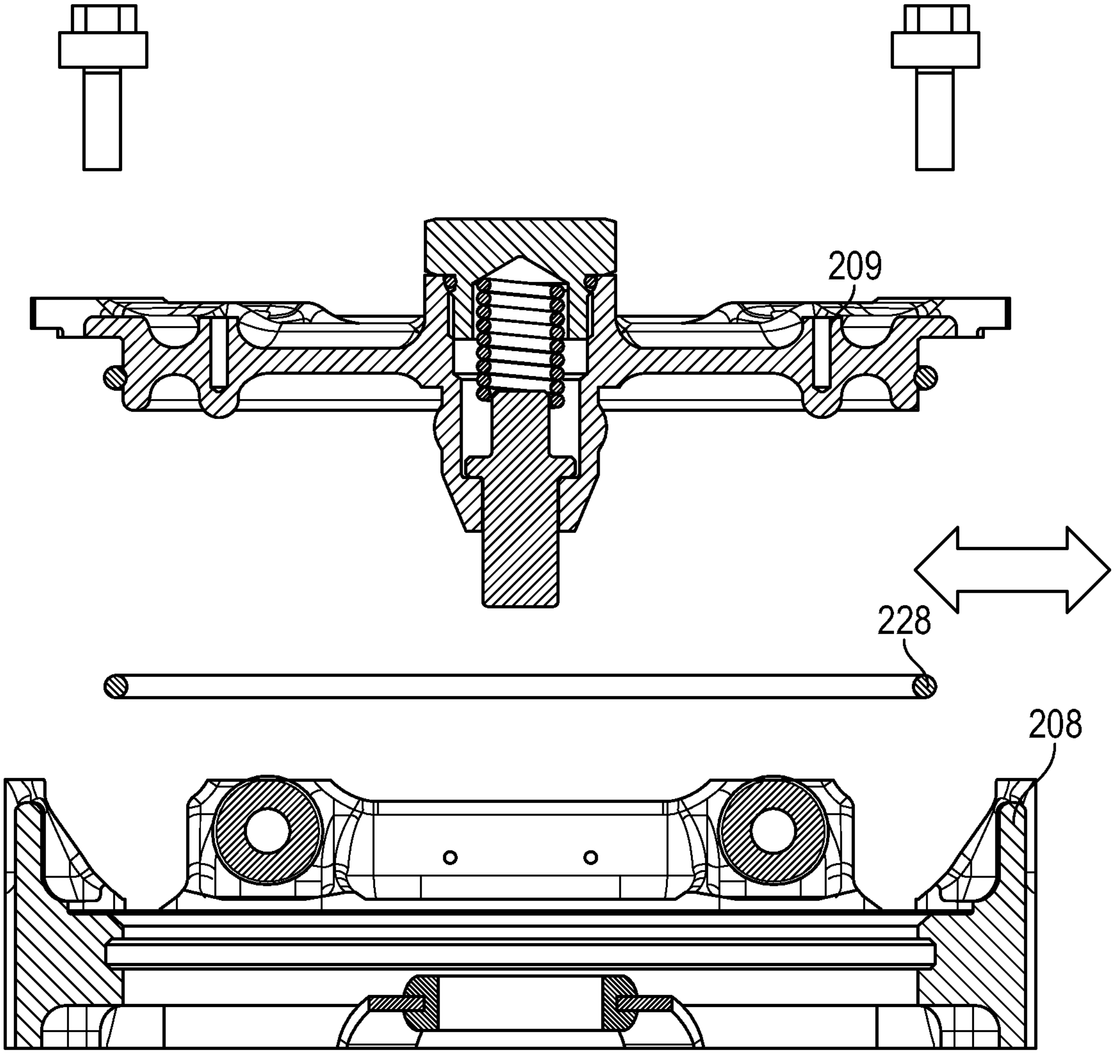
Figure 11C:
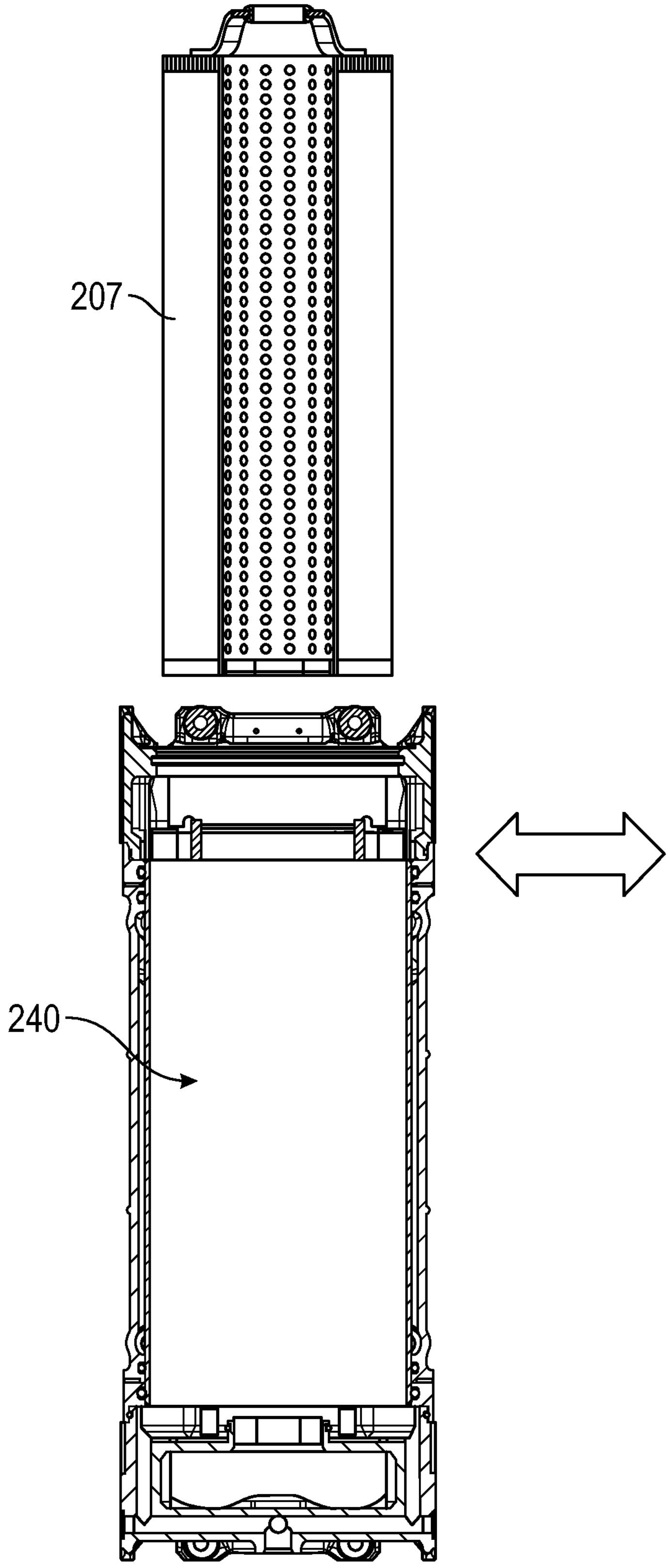
Figure 11D:
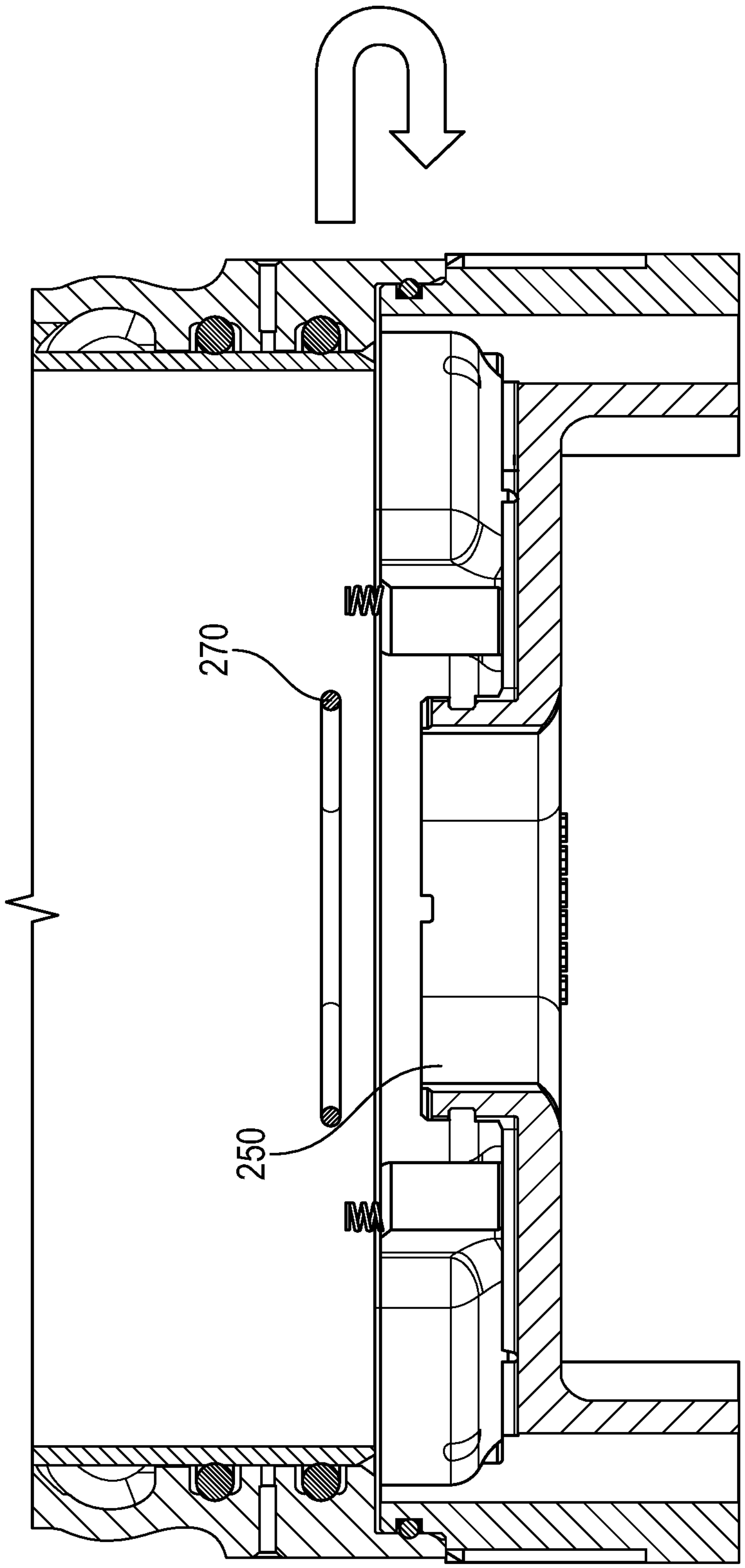

FIGS. 11B-11D are cross-sectional views. As shown in FIG. 11B, the seal 228 can be removed from the housing (here the outlet manifold 208) along with the cover 209 for replacement if desired. The coalescing filter 207 can be removed from the housing (removed from the inner cavity 240) as shown in FIG. 11C. As shown in FIG. 11D, the seal 270 can be removed from the filter interface 250 and replaced. Such replacement seal 270 can then be coupled to the filter interface 250 and the process described can be reversed. Thus, a new or replacement coalescing filter 207 can be inserted into the housing (inserted into the inner cavity 240) as shown in FIG. 11C. A new or replacement seal 228 can be coupled to the housing as shown in FIG. 11B. The cover 209 can be attached to the outlet manifold 208 as shown in FIG. 11A.

INDUSTRIAL APPLICABILITY

In operation, the engine 100 can be configured to combust fuel to generate power. While typically efficient, a small portion of the combustion gases may escape the combustion chamber past the piston as blow-by and enter undesirable areas of the engine 100 such as the crankcase. The present disclosure contemplates a system 102 including one or more oil separation devices 104 to filter oil to remove the oil from the blow-by gas.

Oil separation devices containing coalescing filters are known, however, these have disadvantages. For example, these devices can have a coalescing filter that can be hard to access for service, can be hard to properly align relative to a housing of the oil separation device 104, and/or can be inadequately or improperly constrained from excessive vibration. As a result of the two later problems, the durability of the coalescing filter can be negatively impacted. Additionally, improper alignment of the coalescing filter can result in an undesired leakage of oil.

The oil separation device 104 discussed has various features that address these and other problems. For example, the coupling assembly 282 can be configured as a handle for ease of grasping during service for insertion and removal of the coalescing filter 207 from the housing. This improves accessibility of the coalescing filter 207 for service.

The coupling assembly 282 with the plurality of arms 286 and the grommet 284 can allow for relatively uninhibited flow of the blow-by gas within the cavity 242 of the outlet manifold 208 even while acting as the handle. Furthermore, the coupling assembly 282 via engagement with the projection 234, can align the coalescing filter 207 relative to the housing and can constrain a radial movement of the coalescing filter 207 relative to the centerline axis of the housing to reduce vibration of the coalescing filter 207 in a radial direction. Additionally, to reduce vibration, the oil separation device 104 is configured to axial compression load the coalescing filter 207. In particular, the plunger 232 as biased by the spring 230 can reduce axial vibration of the coalescing filter 207 relative to the housing via engagement between the plunger 232 and the upper end cap 278. On a lower portion of the coalescing filter 207 and the oil separation device 104, the filter interface 250 (a projecting feature) when received in the aperture 264 constrains a rotation of the coalescing filter 207 relative to the housing (e.g., relative to the outer housing 204, the inner housing 206, the outlet manifold 208, and/or the cover 209, etc.). As a result of these components and features, the oil separation device 104, and in particular, the coalescing filter 207 can have a long hour durability even under high vibration loading.

Additionally, the oil separation device 104 can include inlet manifold 202 and outlet manifold 208 with configurations that allow blow-by gas into and from the manifold in any desired direction (housing design for inlet manifold 202 and the outlet manifold 208 allows for up to 360 degrees routing of the blow-by gas). As such, the oil separation device 104 offers a configurability, commonality, scalability and modularity not found with typical oil separation devices. This configurability, commonality, scalability and modularity can address a wide range of multi-displacement and different power density engine platforms. For example, the present oil separation devices 104 can be configurable directly together as assemblies such as in multi-row parallel arrays, multi-row series arrays, U-shaped arrays, L-shape arrays, T-shaped arrays, H-shaped arrays, single row arrays, etc. This modularity (the desired number of oil separation devices can be easily selected and implemented together as an array) can provide for the configurability, commonality, scalability and modularity needed to address various engine platforms. The assemblies described can be easily constructed to handle various volumes of blow-by gas and other fluids as desired for various engine and/or auxiliary component needs. The inlet manifold 202 and the outlet manifold 208 can both include a plurality of ports. These ports can be located along multiple sides/faces (e.g., corresponding to the four faces of the inlet and/or outlet manifolds, for example). This can allow for various routing directions of blow-by gas. Additionally, this configuration can allow the oil separation devices to be placed in close proximity (e.g., abutting or spaced a small distance) communicating with one another as desired.

The above detailed description is intended to be illustrative, and not restrictive. The scope of the disclosure should, therefore, be determined with references to the appended claims, along with the full scope of equivalents to which such claims are entitled.

What is claimed is:

1. A coalescing filter comprising:

a filter media;

a central core defining a central cavity, the central core positioned within the filter media;

a first end cap enclosing a first axial end of the filter media and a first axial end of the central core;

a coupling assembly attached to and extending outward from the first end cap, wherein the coupling assembly is configured to couple with a housing to position the coalescing filter within the housing; and a second end cap opposing the first end cap;

wherein the first end cap includes at least one of a ridge or a pocket on an outer surface thereof that faces and is positioned below the coupling assembly.

2. The coalescing filter of claim 1, wherein the coupling assembly comprises:

a grommet having a thru-hole configured to receive a projection of the housing; and a plurality of arms coupled to the grommet and the first end cap, wherein the plurality of arms are in a spaced relationship and extend outward and downward from the grommet to the first end cap such that the grommet is spaced from the first end cap.

3. The coalescing filter of claim 2, wherein one or more of the plurality of arms includes a first arcuately curved portion and a second arcuately curved portion, wherein the first arcuately curved portion is attached to the grommet and the second arcuately curved portion is attached to the first end cap, wherein the first arcuately curved portion is spaced from the second arcuately curved portion by an intermediate portion, and wherein the first arcuately curved portion has a first radius of curvature in a first direction and the second arcuately curved portion has a second radius of curvature in a second direction.

4. The coalescing filter of claim 2, wherein the plurality of arms are spaced around a centerline axis of the filter to provide for multiple flow paths of a blow-by gas through an outlet manifold of the housing.

5. The coalescing filter of claim 1, wherein the coupling assembly is configured as a handle for insertion and removal of the coalescing filter from the housing.

6. The coalescing filter of claim 1, wherein the coupling assembly is configured to engage the housing to constrain a radial movement of the filter relative to a centerline axis of the housing during operation.

7. The coalescing filter of claim 1, wherein the second end cap as an aperture that forms an inlet port to the central cavity, wherein the aperture has a non-circular shape.

8. The coalescing filter of claim 7, wherein the aperture is configured to receive a correspondingly non-circular shaped projecting feature of the housing, wherein when the projecting feature when received in the aperture constrains a rotation of the filter relative to the housing.

9. The coalescing filter of claim 1, wherein the core is formed by a thin formed cylindrical sheet having a plurality of apertures therein that communicate with the filter media.

10. A coalescing filter comprising:

a filter media having a cylindrical shape configured for insertion into an inner cavity of a housing;

a central core defining a central cavity with a cylindrical shape, the central core positioned within the filter media;

a first end cap; and a second end cap opposing the first end cap, wherein the second end cap has an aperture that forms an inlet port to the central cavity, wherein the aperture has a non-circular shape and is configured to receive a correspondingly shaped projecting feature of the inner cavity of the housing that receives the coalescing filter.

11. The coalescing filter of claim 10, further comprising a coupling assembly attached to and extending outward from the first end cap, wherein the coupling assembly is configured to couple with a cover of a housing to position the coalescing filter within the housing.

12. The coalescing filter of claim 11, wherein the coupling assembly comprises:

a grommet having a thru-hole configured to receive a projection of the cover; and a plurality of arms coupled to the grommet and the first end cap, wherein the plurality of arms are in a spaced relationship and extend outward and downward from the grommet to the first end cap such that the grommet is spaced from the first end cap.

13. The coalescing filter of claim 12, wherein the plurality of arms are spaced around a centerline axis of the filter to provide for multiple flow paths of a blow-by gas through an outlet manifold of the housing.

14. The coalescing filter of claim 11, wherein the coupling assembly is configured as a handle for insertion and removal of the coalescing filter from the housing, wherein the coupling assembly is configured to engage the cover to constrain a radial movement of the filter relative to a centerline axis of the housing during operation.

15. The coalescing filter of claim 10, wherein the core is formed by a thin formed cylindrical sheet having a plurality of apertures therein that communicate with the filter media.

16. The coalescing filter of claim 10, wherein the second end cap includes an axially inward extending flange forming at least a portion of the aperture, and wherein the flange is configured to form a seal with a filter interface of the housing.

17. A device for filtering oil mist from blow-by gas, comprising:

a housing forming an inner cavity, an outlet manifold and an inlet manifold, wherein the housing includes a removable and attachable cover for partially enclosing the outlet manifold; and a coalescing filter insertable and removable from the inner cavity, the coalescing filter comprising:

a filter media;

a central core defining a central cavity, the central core positioned within the filter media;

a first end cap;

a coupling assembly positioned within the outlet manifold, attached to and extending outward from the first end cap, wherein the coupling assembly receives a projection of the cover and is configured to position the coalescing filter within the housing, wherein the coupling assembly includes:

a grommet with a thru hole; and a plurality of arms coupled to the grommet and the first end cap;

wherein the grommet with the thru hole receives a projection of the cover;

wherein engagement between the grommet and projection constrain a radial movement of the coalescing filter relative to a centerline axis of the housing during operation;

and wherein the projection of the cover forms a receptacle to receive a spring and plunger, wherein the plunger is configured to engage the first end cap of the filter, and wherein the spring and plunger constrain an axial movement of the filter within the inner cavity of the housing; and a second end cap opposing the first end cap.

18. The device of claim 17, wherein the coupling assembly includes a plurality of arms spaced around a centerline axis of the coalescing filter to provide for multiple flow paths of a blow-by gas through the outlet manifold, wherein the coupling assembly is configured as a handle for insertion into and removal of the coalescing filter from the inner cavity of the housing.

19. The device of claim 17, wherein the first end cap includes at least one of a ridge or a pocket that receives the plunger.

20. The device of claim 17, wherein the second end cap as an aperture that forms an inlet port to the central cavity, wherein the aperture has a non-circular shape, wherein the inlet manifold has a correspondingly shaped projecting feature that is received by the aperture, wherein the non-circular shape of the aperture and the projecting feature constrain a rotation of the filter relative to the housing.

* * * * *